US012063474B2

(12) United States Patent
Westmarland et al.

(10) Patent No.: US 12,063,474 B2
(45) Date of Patent: Aug. 13, 2024

(54) METHODS OF ENVIRONMENTAL PROTECTION FOR SILICON MEMS STRUCTURES IN CAVITY PACKAGES

(71) Applicant: Infineon Technologies AG, Neubiberg (DE)

(72) Inventors: Paul Westmarland, Surrey (GB); Bernd Goller, Otterfing (DE); Scott Palmer, Surrey (GB); Mark Pavier, Felbridge (GB)

(73) Assignee: INFINEON TECHNOLOGIES AG, Neubiberg (DE)

( * ) Notice: Subject to any disclaimer, the term of this patent is extended or adjusted under 35 U.S.C. 154(b) by 197 days.

(21) Appl. No.: 17/660,239

(22) Filed: Apr. 22, 2022

(65) Prior Publication Data

US 2022/0369042 A1 Nov. 17, 2022

(30) Foreign Application Priority Data

May 11, 2021 (EP) .................................... 21173435

(51) Int. Cl.
*H04R 19/04* (2006.01)
*H04R 7/06* (2006.01)
*H04R 7/18* (2006.01)

(52) U.S. Cl.
CPC ............... *H04R 19/04* (2013.01); *H04R 7/06* (2013.01); *H04R 7/18* (2013.01); *H04R 2201/003* (2013.01); *H04R 2307/025* (2013.01)

(58) Field of Classification Search
CPC . H04R 1/086; H04R 19/005; H04R 2201/003
See application file for complete search history.

(56) References Cited

U.S. PATENT DOCUMENTS

| | | | |
|---|---|---|---|
| 9,565,488 | B2 | 2/2017 | Friza et al. |
| 9,584,889 | B2 | 2/2017 | Escher-Poeppel et al. |
| 9,706,294 | B2 | 7/2017 | Kopetz et al. |
| 10,167,188 | B2 | 1/2019 | Agashe et al. |
| 10,587,942 | B1 | 3/2020 | Minervini et al. |
| 2005/0207605 | A1 | 9/2005 | Dehe et al. |

(Continued)

FOREIGN PATENT DOCUMENTS

WO WO-2019020638 A1 * 1/2019 ............... H04R 1/04

OTHER PUBLICATIONS

Feiertag, Gregor et al., "Flip chip packaging for MEMS microphones", Microsyst Technol, Technical Paper, 16:817-823, DOI 10.1007/s00542-010-1039-3, Feb. 6, 2010, 7 pages.

*Primary Examiner* — Ryan Robinson
(74) *Attorney, Agent, or Firm* — Slater Matsil, LLP

(57) ABSTRACT

A sound transducer device includes a multilayer component board having a first side and an opposite second side, and a sound port extending between the first and second sides of the multilayer component board. The sound transducer also includes a MEMS sound transducer die including a suspended membrane structure, wherein the MEMS sound transducer die is arranged at the first side of the multilayer component board such that the suspended membrane structure is in fluid communication with the sound port. The sound transducer also includes a mesh structure for providing an environmental barrier, the mesh structure covering the sound port from either one of the first and second sides of the multilayer component board.

19 Claims, 22 Drawing Sheets

(56) References Cited

U.S. PATENT DOCUMENTS

2014/0044297 A1* 2/2014 Loeppert ................ H04R 1/086
381/355
2014/0064542 A1* 3/2014 Bright .................... H04R 1/086
381/359
2014/0091406 A1* 4/2014 Harney .................. H04R 31/00
438/51
2014/0140533 A1* 5/2014 Malek .................... H04R 1/086
29/527.1
2015/0061048 A1* 3/2015 Escher-Poeppel ..... H04R 1/021
438/51
2015/0086050 A1* 3/2015 Feyh ................... B81C 1/00269
257/416
2015/0304787 A1* 10/2015 Harney .................. H04R 1/086
29/594
2016/0037243 A1* 2/2016 Lippert .................. H04R 1/023
381/166
2016/0205463 A1* 7/2016 Szczech ................. H04R 19/04
381/350
2016/0261941 A1* 9/2016 Brioschi ................ H04R 1/086
2016/0316285 A1* 10/2016 Qian ...................... H04R 1/086
2016/0376144 A1* 12/2016 Holliday ................ H04R 1/086
257/416
2017/0245036 A1* 8/2017 Kuki .......................... C08J 5/18
2018/0115811 A1* 4/2018 Zhang .................... H04R 1/086
2018/0146302 A1* 5/2018 Chen ...................... H04R 19/04
2018/0167723 A1* 6/2018 Wang ................... H04R 1/2876
2019/0239000 A1* 8/2019 Allegato ............. B81C 1/00309
2020/0087139 A1* 3/2020 Shiraishi ................... B81B 7/02
2020/0107096 A1 4/2020 Minervini et al.
2020/0137501 A1* 4/2020 Piechocinski .......... H04R 1/086
2020/0169818 A1* 5/2020 Rombach ............... H04R 1/086
2020/0209024 A1* 7/2020 Lim .................... G01L 19/0636
2021/0051417 A1* 2/2021 Take .................. B01D 39/1676
2021/0092500 A1 3/2021 Lo et al.
2021/0114866 A1* 4/2021 Pahl ..................... H04R 19/005
2021/0176549 A1* 6/2021 Zeng ...................... H04R 19/04
2022/0033249 A1* 2/2022 Brockmeier ............. H04R 1/04
2022/0150609 A1* 5/2022 Albers .................. B81B 7/0032
2023/0036176 A1* 2/2023 Kim ......................... H04R 1/04
2023/0092860 A1* 3/2023 Knutzen ................ H04R 1/222
381/386
2023/0131440 A1* 4/2023 Diego Regla .......... H04R 1/086
381/361
2023/0202833 A1* 6/2023 Füldner ................. B81B 7/0061
257/415
2023/0262372 A1* 8/2023 Minervini ................ H04R 1/08
381/355
2023/0269543 A1* 8/2023 Nakamoto ............ B81B 7/0064
381/91
2023/0370757 A1* 11/2023 Dobos .................... H04R 1/086

* cited by examiner

METHODS OF ENVIRONMENTAL PROTECTION FOR SILICON MEMS STRUCTURES IN CAVITY PACKAGES

CROSS-REFERENCE TO RELATED APPLICATIONS

This application claims the benefit of European Patent Application No. 21173435, filed on May 11, 2021, which application is hereby incorporated herein by reference.

TECHNICAL FIELD

Embodiments of the present disclosure relate to a sound transducer device comprising a MEMS sound transducer die comprising a suspended membrane structure. The sound transducer device further comprises an environmental barrier for preventing environmental elements like fluids, particulate matter or other objects from entering the sound transducer device. This provides for an effective protection of potential damage of the membrane.

BACKGROUND

In nowadays consumer electronics, it is desired to provide very well performing sound transducer devices, like microphones and loudspeakers, while said sound transducer devices shall at the same time comprise a very small form factor. In order to accomplish this task, sound transducer devices may comprise MEMS (Micro Electro Mechanical System) sound transducers, like MEMS microphones or MEMS speakers. They may comprise very thin membranes, e.g. made from silicon.

Such miniaturized sound transducer devices also have an opening (also called: sound port) to allow the admission of sound onto the (e.g., silicon) membrane that converts the sound to an electrical signal. However, such an opening makes the thin membrane vulnerable to the exterior environment, where water, dust or other physical objects penetrating the sound port may render the membrane, and therefore the entire sound transducer device, inoperable. To prevent this occurrence, some conventional approaches try to protect the sound port by way of membranes and protective mesh grills that are integrated into the casing of the electronic appliance, for example into a phone case of a mobile phone or a smart phone. However, this conventional approach requires an increase in physical volume and also in number of components that have to be provided and used on the casing.

Thus, it would be desirable to provide a sound transducer device having a good sound performance despite a small form factor, and in which the fragile membrane is protected from potential damage by environmental elements like fluids, particulate matter or other objects. In this regard, it is also desired to provide a sound transducer device which allows for a reduction in physical volume and number of components to be used for effectively protecting the membrane.

Thus, it is suggested to provide a sound transducer device according to claim 1. Further advantageous embodiments are given in the dependent claims.

SUMMARY

The sound transducer device of the herein describe innovative principle comprises a multilayer component board having a first side and an opposite second side, and a sound port extending between the first and second sides of the multilayer component board. The sound transducer device further comprises a MEMS (Micro Electro Mechanical System) sound transducer die comprising a suspended membrane structure. The MEMS sound transducer die is arranged at the first side of the multilayer component board such that the suspended membrane is in fluid communication with the sound port. According to the herein described innovative principle, a mesh structure is provided for providing an environmental barrier, the mesh structure covering the sound port from either one of the first and second sides of the multilayer component board.

BRIEF DESCRIPTION OF THE DRAWINGS

In the following, embodiments of the present disclosure are described in more detail with reference to the figures, in which.

DETAILED DESCRIPTION OF ILLUSTRATIVE EMBODIMENTS

Figure 1A:
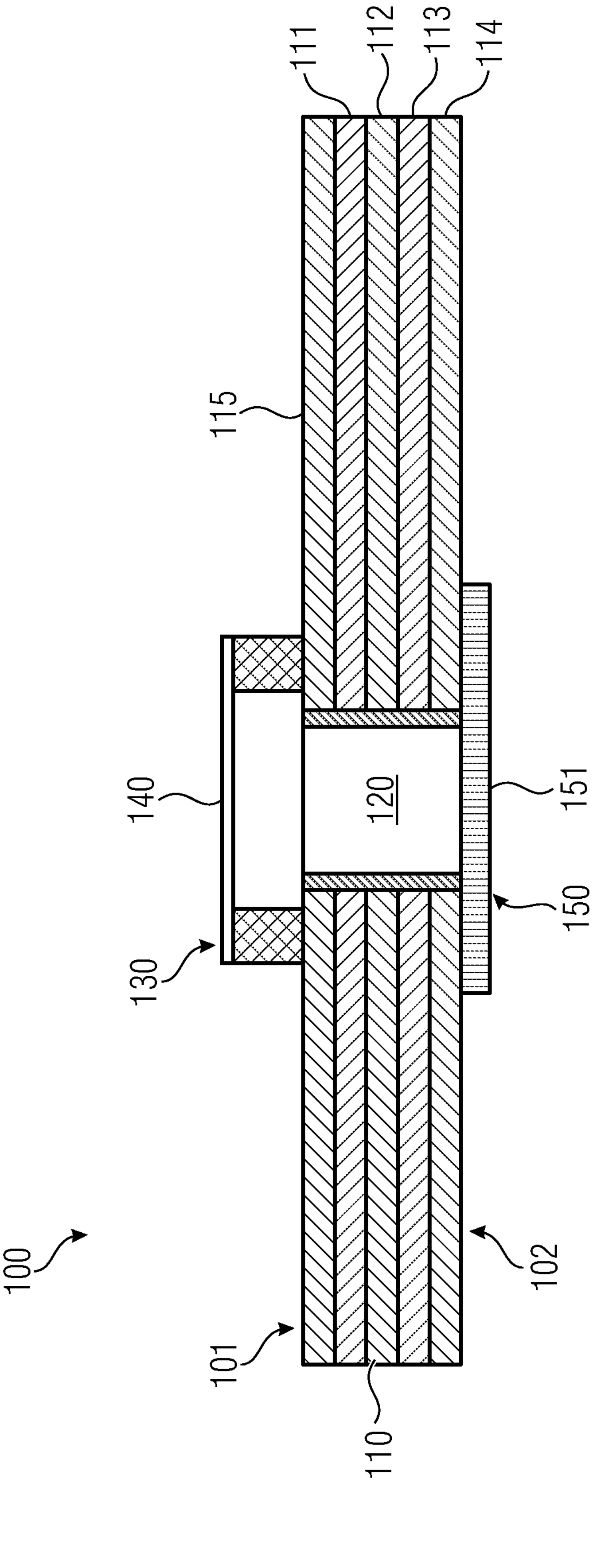
FIG. 1A shows a cross-sectional view of a sound transducer device according to an embodiment.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

In the following description of the FIGS., some embodiments will be discussed which may comprise a mesh structure comprising at least one mesh comprising or being made from a first material (e.g., a steel mesh). Some further embodiments will be discussed having a mesh structure comprising at least one mesh comprising or being made from a second material (e.g., a semiconductor material like a silicon platelet). However, in each of the herein described embodiments, the at least one mesh of the first material and the at least one mesh of the second material are interchangeable. Accordingly, any embodiment being described as having at least one mesh of a first material (e.g., a steel mesh) may additionally or alternatively comprise at least one mesh of a second material (e.g., a semiconductor mesh), while any embodiment being described as having at least one mesh of a second material (e.g., a semiconductor mesh) may additionally or alternatively comprise at least one mesh of a first material (e.g., a steel mesh).

Further, the following examples described with reference to the FIGS. may comprise a mesh structure being made as a single mesh structure having at least one, and preferably exactly one, single mesh. However, it may also be possible that each of the described mesh structures is made as a multi-mesh structure comprising at least two, or exactly two, single meshes. In the latter, the single meshes may be stacked atop each other and physically touching each other. The single meshes of the multi-mesh structure may be located at either the first or the second side of the multilayer component board. Alternatively, the single meshes of the multi-mesh structure may be spatially separated. For instance, a first single mesh may be located at the first side of the multilayer component board while a second single mesh may be located at the second side of the multilayer component board.

Furthermore, the following exemplary embodiments show already singulated (e.g., diced) sound transducer devices. A plurality of such sound transducer devices may be manufactured, in the way as described herein, on a common substrate and be singulated afterwards. Each of the herein described embodiments may be coated with a water repellent coating such that the sound transducer device may comprise water repellent properties. In this regard, either the entire substrate may be coated or the singulated sound transducer devices may be coated with said water repellent coating. In particular, the herein described mesh structure may be coated with said water repellent coating.

Yet further, some embodiments will be described herein with reference to a diameter. A diameter may particularly be used for circular geometries. For example, a circular recess provided in a substrate may comprise a certain diameter. However, if a recess may comprise a non-circular shape, e.g. an angular or square shape, then the described term ‘diameter’ may also include a width or a length of said non-circular recess.

FIG. 1A shows a non-limiting example of a sound transducer device 100 according to the herein described innovative principle. The sound transducer device 100 comprises a multilayer component board 110 having a first side 101 and an opposite second side 102.

The multilayer component board 110 may, for instance, be a PCB (Printed Circuit Board) having a plurality of stacked pre-preg and/or metal layers 111, . . . , 114. The uppermost layer 115 may comprise copper tracking layers or copper traces.

The sound transducer device 100 further comprises a sound port 120 extending between the first and second sides 101, 102 of the multilayer component board 110. The sound transducer device 100 further comprises a MEMS (Micro Electro Mechanical System) sound transducer die 130 comprising a suspended membrane structure 140. The MEMS sound transducer die 130 is arranged at the first side 101 of the multilayer component board 110 such that the suspended membrane structure 140 is in fluid communication with the sound port 120.

The sound transducer device 100 further comprises a mesh structure 150 for providing an environmental barrier, the mesh structure 150 covering the sound port 120 from either one of the first and second sides 101, 102 of the multilayer component board 110. In the example shown in FIG. 1, the mesh structure 150 covers the sound port 120 from the second side 102 of the multilayer component board 110. However, other embodiments in which the mesh structure 150 covers the sound port from the first side 101 of the multilayer component board 110 will be discussed below.

In this non-limiting example, the mesh structure 150 may comprise at least one, and preferably exactly one, single mesh 151. The mesh structure 150 may therefore be referred to as a single mesh structure. The single mesh 151 of the single mesh structure 150 may be a metal mesh, for example a stainless steel metal mesh. In this case, the mesh structure 150 may also be referred to as a metal mesh structure. The metal mesh structure 150 may comprise a laser cut metal mesh or an etched metal mesh, and in particular a chemically etched metal mesh.

Alternatively, the mesh structure 150 may comprise at least one single mesh comprising or being made from semiconductor material. For example, the mesh structure 150 may comprise a semiconductor (e.g., silicon) platelet comprising a plurality of vertically etched through holes acting as the environmental barrier. In this case, the mesh structure 150 may also be referred to as a semiconductor mesh structure.

Both the metal mesh structure 150 and the semiconductor mesh structure 150 may comprise dimensions in a range of microns, thus being referred to as Micro Mechanical Systems.

As mentioned above, the mesh structure 150 may comprise at least one, and preferably exactly one, single mesh 151. Thus, the mesh structure 150 may also be referred to as a single mesh structure. Other examples may be discussed below, wherein the mesh structure 150 may comprise at least two, and preferably exactly two, single meshes 151, 152 and may therefore be referred to as a multi-mesh structure. Such a multi-mesh structure may also be used in each of the other examples and embodiments as discussed herein, instead of the previously discussed single mesh structure 150. In turn if a multi-mesh structure 150 is discussed with reference to a Figure, then a multi-mesh structure 150 may also be used instead of the single mesh structure 150.

That is, a single mesh structure 150 and a multi-mesh structure 150 may be interchangeable. As far as the term mesh structure 150 is used herein, this term shall cover single mesh structures 150 and multi-mesh structures 150.

Figure 1B:
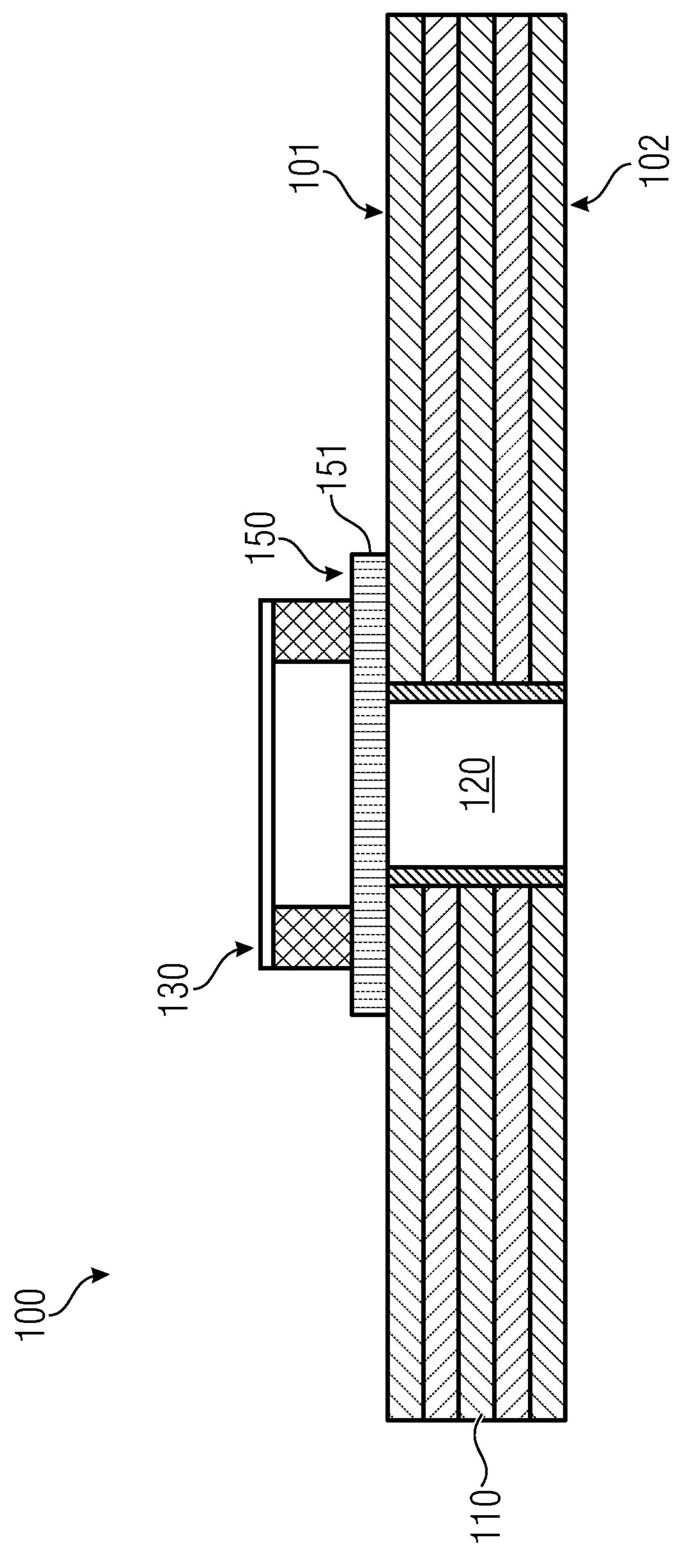
FIG. 1B shows a cross-sectional view of a sound transducer device according to a further embodiment.

FIG. 1B shows a further non-limiting example of a sound transducer device 100 according to the herein described innovative principle. Like elements with like functions will be referenced with like reference numerals. One major difference to the example described above is the location of the mesh structure 150.

As can be seen in FIG. 1B, the mesh structure 150 may be located at the first side 101 of the multilayer component board 110. In other words, the mesh structure 150 may cover the sound port 120 from the first side 101 of the multilayer component board 110. The mesh structure 150 may be arranged between the multilayer component board 110 and the MEMS sound transducer die 130. In this case, the mesh structure 150 may be in direct contact with the first side 101 of the multilayer component board 110 and in direct contact with the MEMS sound transducer die 130.

In this non-limiting example of FIG. 1B, the mesh structure 150 may comprise at least one, and preferably exactly one, single mesh 151. Thus, the mesh structure 150 may be referred to as a single mesh structure. However, a multi-mesh structure may be used in the example shown in FIG. 1B, instead of the depicted and discussed single mesh structure 150.

Figure 1C:
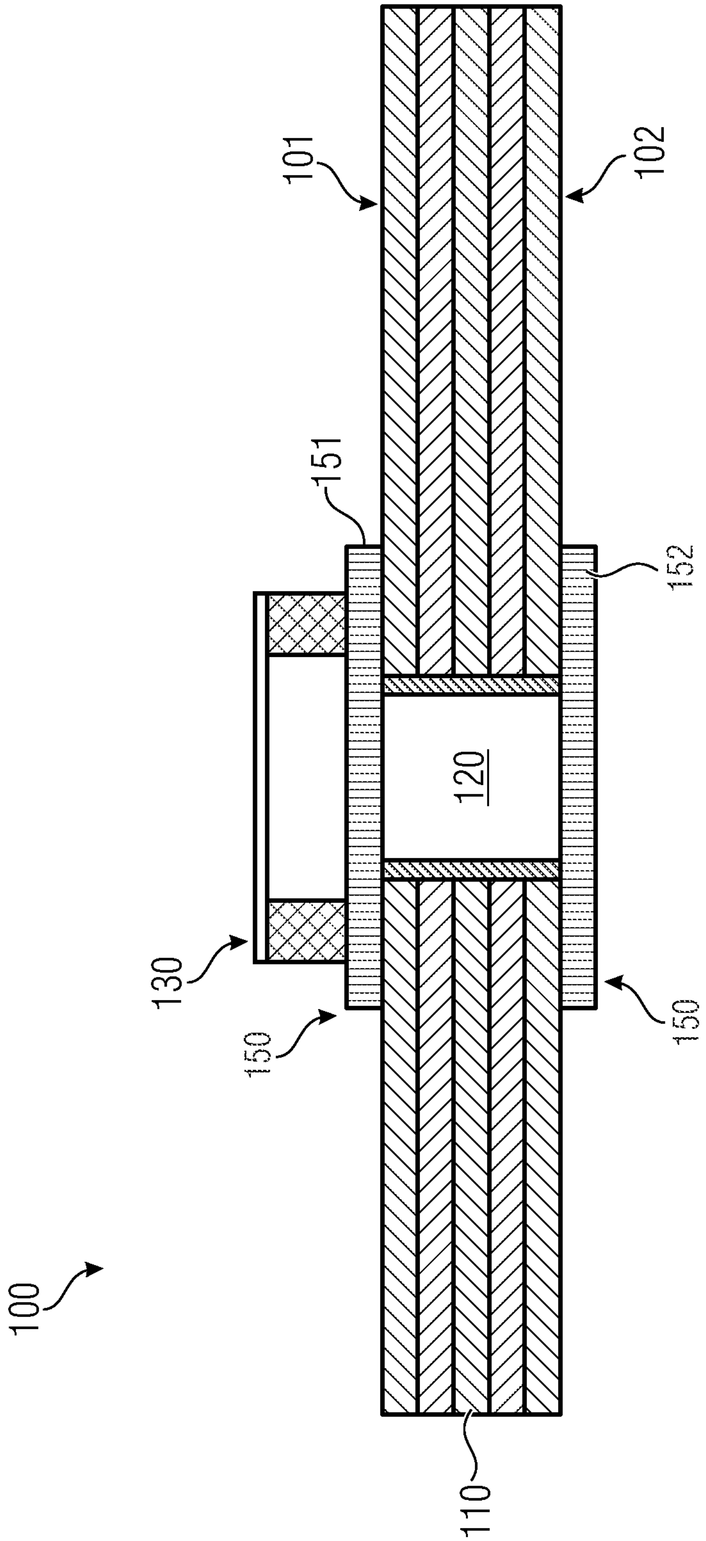
FIG. 1C shows a cross-sectional view of a sound transducer device according to a further embodiment.

FIG. 1C shows a further non-limiting example of a sound transducer device 100 according to the herein described innovative principle. Like elements with like functions will be referenced with like reference numerals. One major difference to the examples described above is the kind of mesh structure 150 being used.

As can be seen in FIG. 1C, the mesh structure 150 may be configured as a multi-mesh structure 150 comprising at least two, and preferably exactly two, single meshes 151, 152. These at least two single meshes 151, 152 may be spatially separated from each other. These at least two single meshes 151, 152 may preferably comprise the same dimensions. However, they may alternatively comprise different dimensions. This may hold for each multi-mesh structure 150 as described herein.

A first single mesh 151 may be located at the first side 101 of the multilayer component board 110. In other words, the first single mesh 151 may cover the sound port 120 from the first side 101 of the multilayer component board 110. The first single mesh 151 may be arranged between the multilayer component board 110 and the MEMS sound transducer die 130. In this case, the first single mesh 151 may be in direct contact with the first side 101 of the multilayer component board 110 and in direct contact with the MEMS sound transducer die 130.

A second single mesh 152 may be located at the second side 102 of the multilayer component board 110. In other words, the second single mesh 152 may cover the sound port 120 from the second side 102 of the multilayer component board 110.

The at least two single meshes 151, 152 may comprise, or be made from, the same material. For instance, each of the at least two single meshes 151, 152 may be made from (stainless) steel or from a semiconductor material. Alternatively, the at least two single meshes 151, 152 may comprise, or be made from, different material. For instance, a first one of the at least two single meshes 151, 152 may be made from (stainless) steel, while a second one of the at least two single meshes 151, 152 may be made from a semiconductor material. This may hold for each multi-mesh structure 150 as described herein.

Figure 1D:
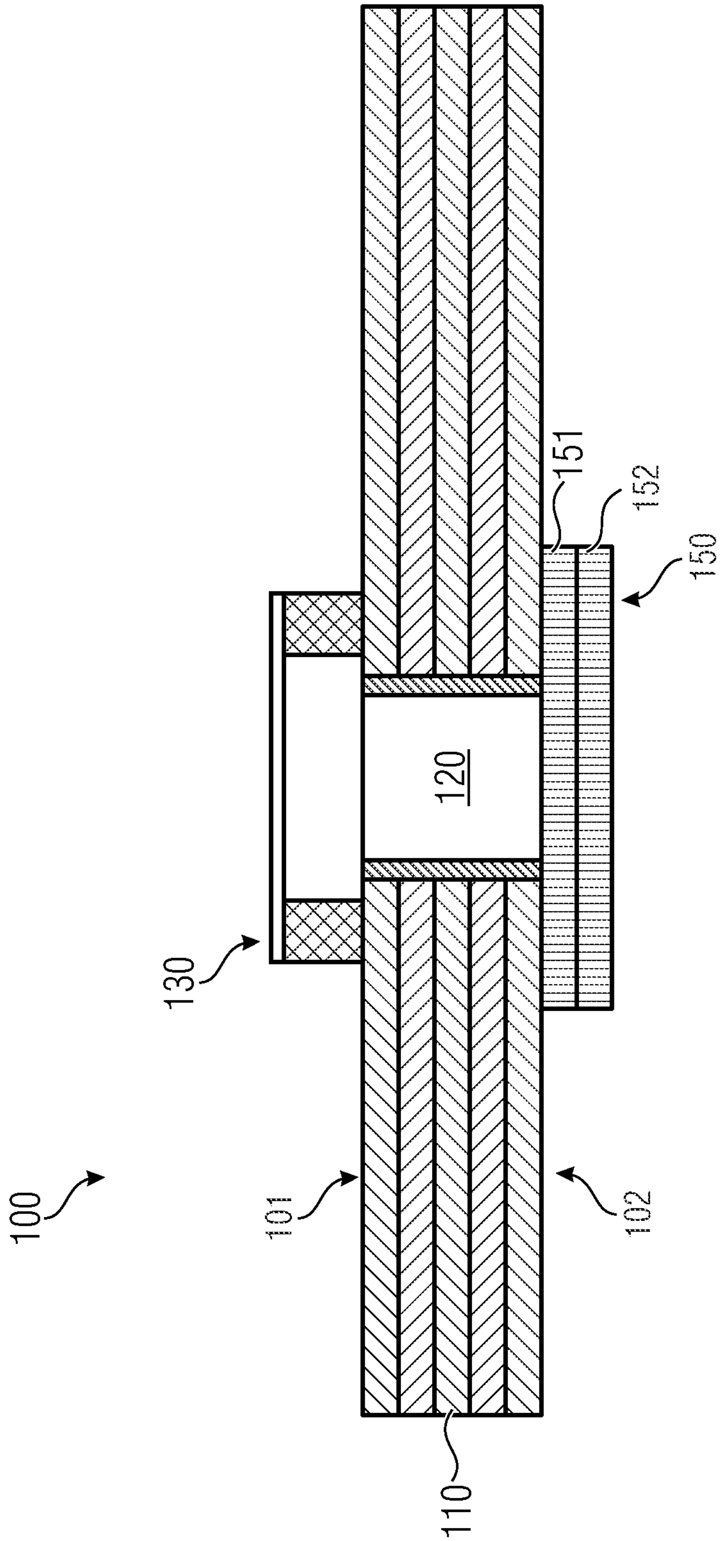
FIG. 1D shows a cross-sectional view of a sound transducer device according to a further embodiment.

FIG. 1D shows a further non-limiting example of a sound transducer device 100 according to the herein described innovative principle. Like elements with like functions will be referenced with like reference numerals. One major difference to the examples described above is the location of the mesh structure 150 and the kind of mesh structure 150 being used.

As can be seen in FIG. 1D, the mesh structure 150 may be configured as a multi-mesh structure 150 comprising at least two, and preferably exactly two, single meshes 151, 152. These at least two single meshes 151, 152 may be connected with each other such that they are in direct contact with each other and are touching each other. These at least two single meshes 151, 152 may be stacked atop each other. They may preferably comprise the same dimensions. However, they may alternatively comprise different dimensions. This may hold for each multi-mesh structure 150 as described herein.

The at least two single meshes 151, 152 may comprise, or be made from, the same material. For instance, each of the at least two single meshes 151, 152 may be made from (stainless) steel or from a semiconductor material. Alternatively, the at least two single meshes 151, 152 may comprise, or be made from, different material. For instance, a first one of the at least two single meshes 151, 152 may be made from (stainless) steel, while a second one of the at least two single meshes 151, 152 may be made from a semiconductor material. This may hold for each multi-mesh structure 150 as described herein.

Figure 1E:
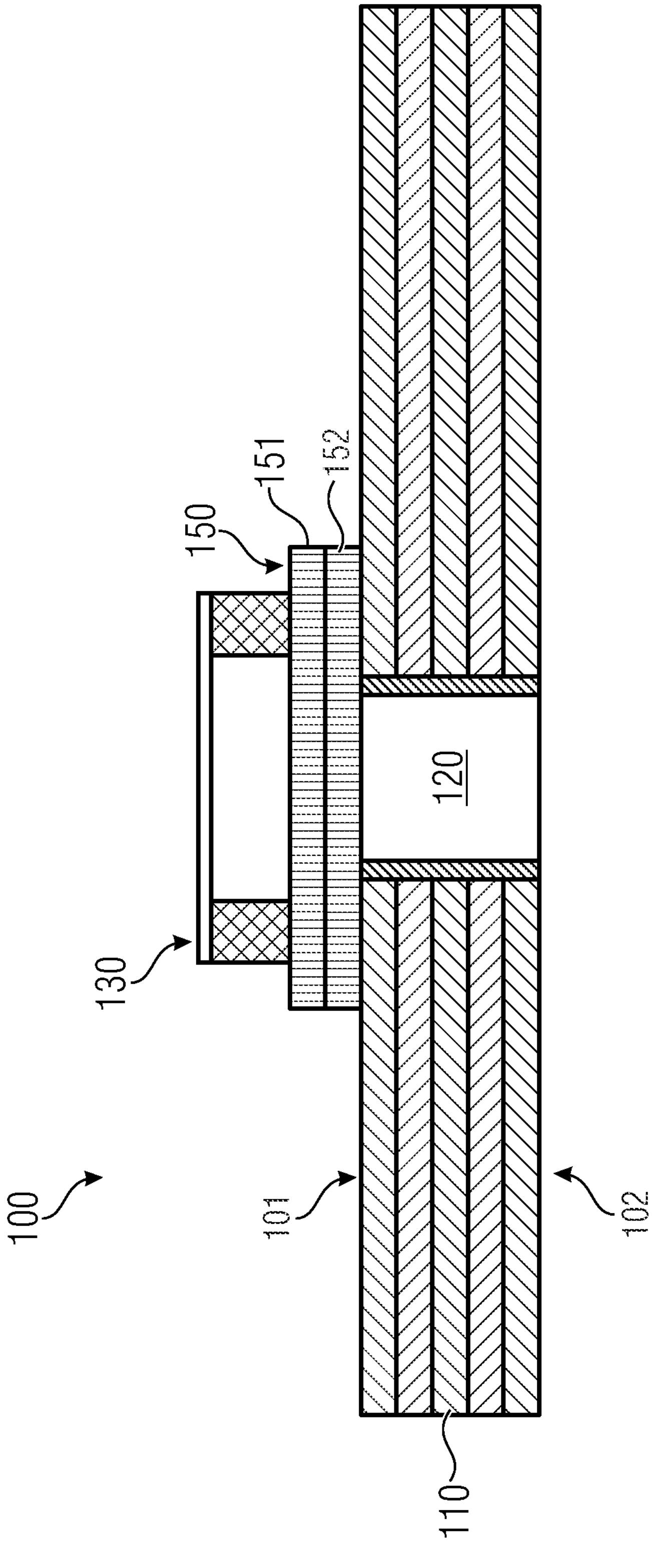
FIG. 1E shows a cross-sectional view of a sound transducer device according to a further embodiment.

FIG. 1E shows a further non-limiting example of a sound transducer device 100 according to the herein described innovative principle. Like elements with like functions will be referenced with like reference numerals. One major difference to the example described above with reference to FIG. 1D is the location of the multi-mesh structure 150.

In the example shown in FIG. 1E, the multi-mesh structure 150 may comprise at least two, and preferably exactly two, single meshes 151, 152 which are in direct contact with each other. The multi-mesh structure 150 may be located at the first side 101 of the multilayer component board 110. In other words, the multi-mesh structure 150 may cover the sound port 120 from the first side 101 of the multilayer component board 110.

The multi-mesh structure 150 may be arranged between the multilayer component board 110 and the MEMS sound transducer die 130. In this case, the mesh structure 150 may be in direct contact with the first side 101 of the multilayer component board 110 and in direct contact with the MEMS sound transducer die 130.

Figure 1F:
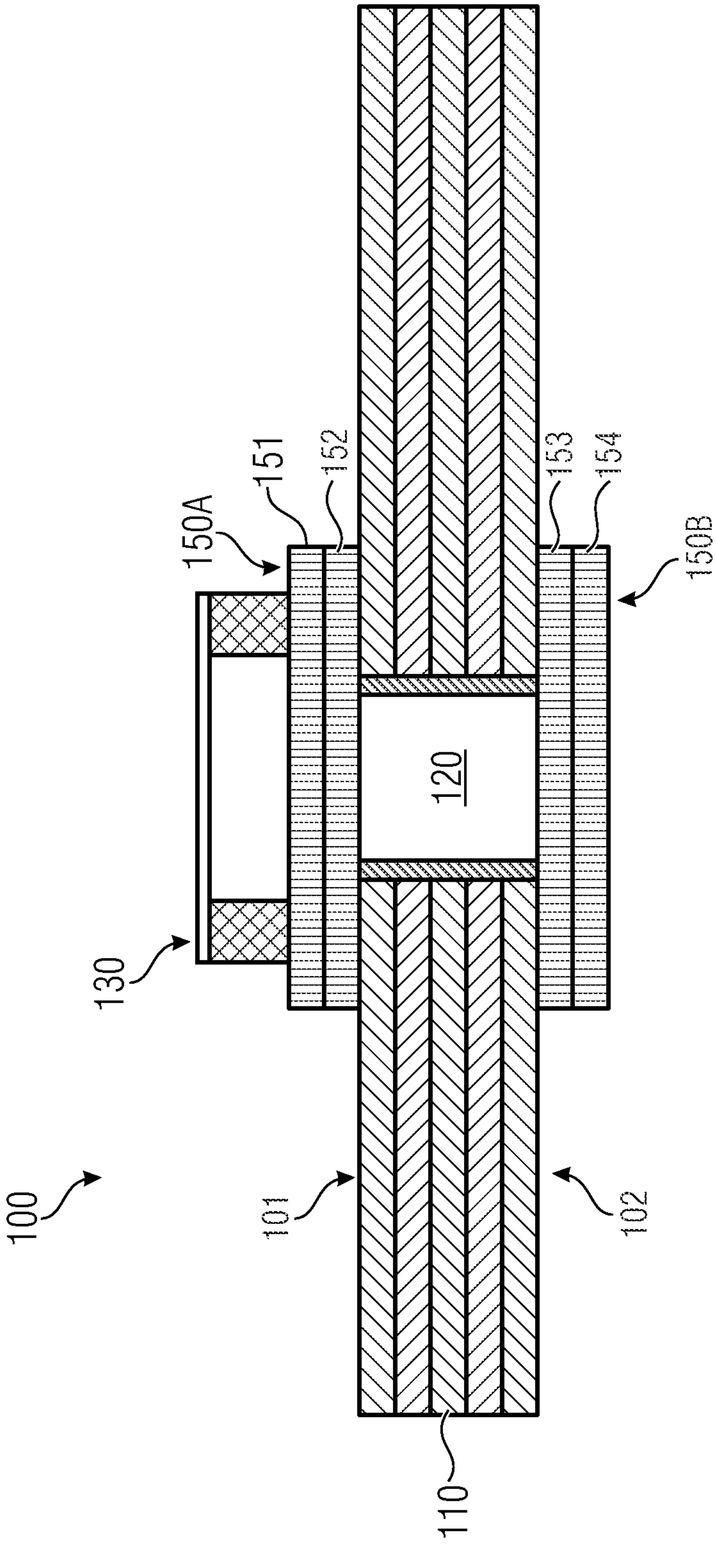
FIG. 1F shows a cross-sectional view of a sound transducer device according to a further embodiment.

FIG. 1F shows a further non-limiting example of a sound transducer device 100 according to the herein described innovative principle. Like elements with like functions will be referenced with like reference numerals. One major difference to the example described above with reference to FIGS. 1D and 1E is the location of the multi-mesh structure 150.

In the example shown in FIG. 1F, the multi-mesh structure 150 may comprise at least four, and preferably exactly four, single meshes 151, 152, 153, 154, wherein two of the at least four single meshes 151, 152, 153, 154 are in direct contact with each other.

A first multi-mesh arrangement 150A of at least, and preferably exactly, two single meshes 151, 152 may be located at the first side 101 of the multilayer component board 110. In other words, said first multi-mesh arrangement 150A of the multi-mesh structure 150 may cover the sound port 120 from the first side 101 of the multilayer component board 110.

The first multi-mesh arrangement 150A may be arranged between the multilayer component board 110 and the MEMS sound transducer die 130. In this case, the first multi-mesh arrangement 150A may be in direct contact with the first side 101 of the multilayer component board 110 and in direct contact with the MEMS sound transducer die 130.

A second multi-mesh arrangement 150B of at least, and preferably exactly, two single meshes 153, 154 may be located at the second side 102 of the multilayer component board 110. In other words, said second multi-mesh arrangement 150B of the multi-mesh structure 150 may cover the sound port 120 from the second side 102 of the multilayer component board 110. The second multi-mesh arrangement 150B may be located between the multilayer component board 110 and the MEMS sound transducer die 130.

Figure 1G:
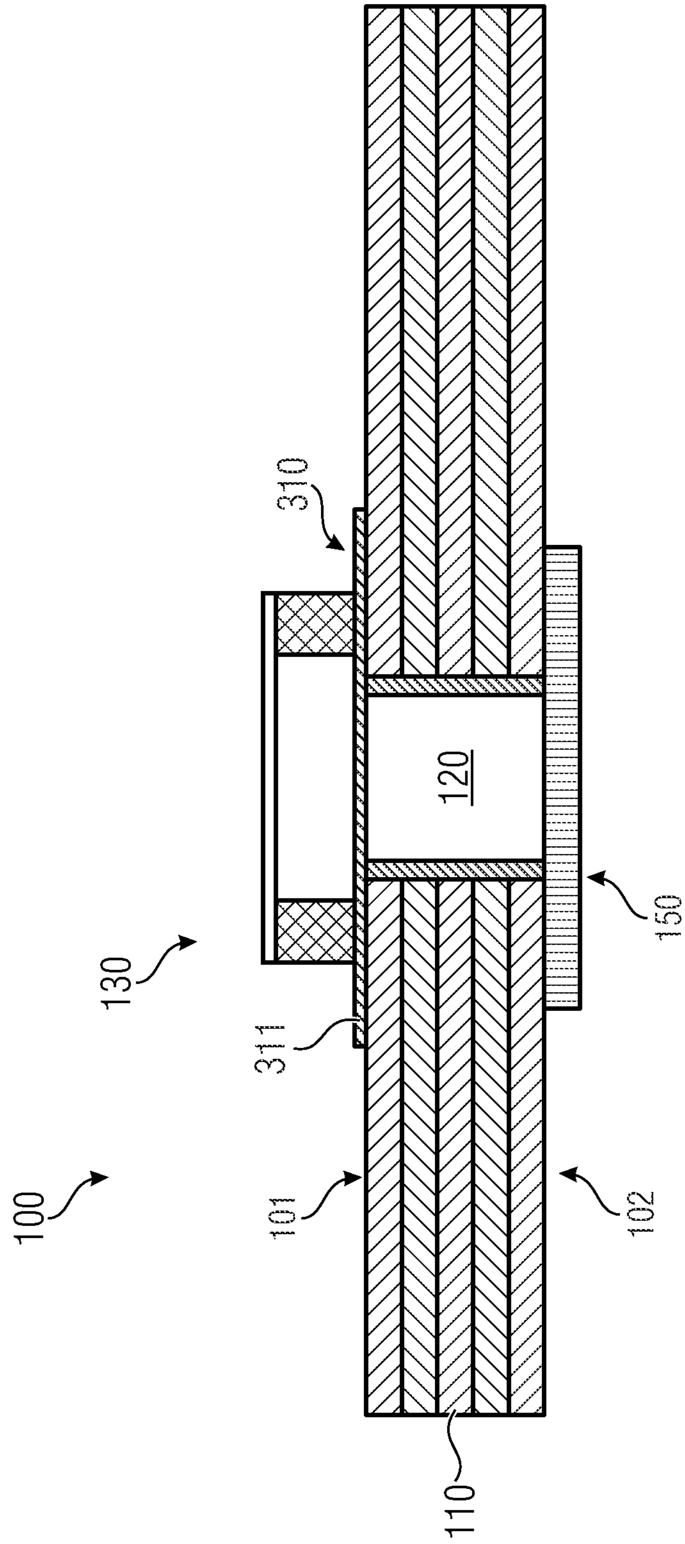
FIG. 1G shows a cross-sectional view of a sound transducer device according to a further embodiment.

FIG. 1G shows a further non-limiting example of a sound transducer device 100 according to the herein described innovative principle. Like elements with like functions will be referenced with like reference numerals. One major difference to the examples described so far is the presence of a further membrane structure 310.

While the presence of the herein described (single or multi) mesh structure 150 may be mandatory, the presence of the herein described (single or multi) membrane structure 310 may be optional.

The function, the construction and the materials used for said further membrane structure 310 may be discussed in more detail below. However, with reference to the following FIGS. 1G to 1Q an overview of possible locations of said further membrane structure 310 shall be given.

As can be seen in FIG. 1G said further membrane structure 310 may comprise at least one single membrane 311, and preferably exactly one single membrane 311. Thus, the further membrane structure 310 may also be referred to as a single membrane structure 310.

Other examples may be discussed below, wherein the membrane structure 310 may comprise at least two, and preferably exactly two, single membranes 311, 312 and may therefore be referred to as a multi membrane structure. Such a multi membrane structure 310 may also be used in each of the other examples discussed herein, instead of the single membrane structure 310. In turn if a multi membrane structure 310 is discussed with reference to a Figure, then a multi membrane structure 310 may also be used instead of the single mesh structure 310.

That is, a single membrane structure 310 and a multi membrane structure 310 may be interchangeable. As far as the term membrane structure 310 is used herein, this term shall cover single membrane structures 310 and multi membrane structures 310.

Furthermore, either of the single membrane structure 310 and the multi membrane structure 310 may be combined with each of the above discussed single mesh structures 150 or multi-mesh structures 150. That is, even though the Figures may show a single mesh structure 150, it may also be a multi mesh structure instead, and vice versa. In turn, even though the Figures may show a single membrane structure 310, it may also be a multi-membrane structure instead, and vice versa.

Returning to FIG. 1G, the (single or multi) membrane structure 310 may be located at the first side 101 of the multilayer component board 110. Accordingly, the (single or multi) membrane structure 310 may cover the sound port 120 from the first side 101 of the multilayer component board 110. The (single or multi) membrane structure 310 may be arranged between the multilayer component board 110 and the MEMS sound transducer die 130. In this case, the (single or multi) membrane structure 310 may be in direct contact with the first side 101 of the multilayer component board 110 and in direct contact with the MEMS sound transducer die 130.

The (single or multi) mesh structure 150 may be located at the second side 102 of the multilayer component board 110. Accordingly, the (single or multi) mesh structure 150 may cover the sound port 120 from the second side 102 of the multilayer component board 110.

Figure 1H:
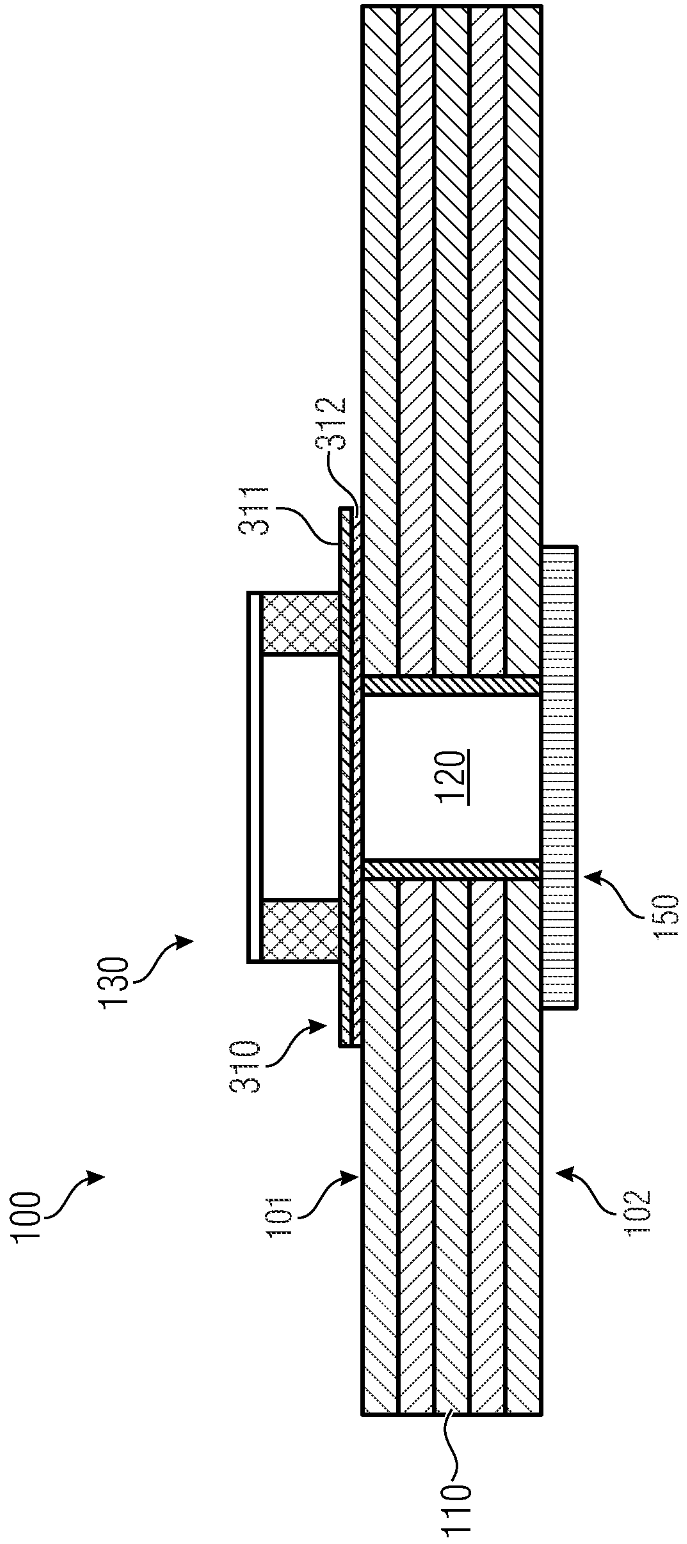
FIG. 1H shows a cross-sectional view of a sound transducer device according to a further embodiment.

FIG. 1H shows a further non-limiting example of a sound transducer device 100 according to the herein described innovative principle. Like elements with like functions will be referenced with like reference numerals. One major difference to the examples described so far is the number of single membranes 311, 312 of the membrane structure 310.

As can be seen in FIG. 1H, the further membrane structure 310 may comprise at least two, and preferably exactly two, single membranes 311, 312. Accordingly, the membrane structure 310 may be referred to as a multi membrane structure. The at least two single membranes 311, 312 may be stacked atop each other and physically touching each other. The multi membrane structure 310 may be located at either the first or the second side 101, 102 of the multilayer component board 110.

Alternatively, the at least two single membranes 311, 312 of the multi-membrane structure 310 may be spatially separated. For instance, a first single membrane 311 may be located at the first side 101 of the multilayer component board 110 while a second single membrane 312 may be located at the second side 102 of the multilayer component board 110 (c.f. FIG. 1N).

In the example shown in FIG. 1H, the multi membrane structure 310 may be located at the first side 101 of the multilayer component board 110. Accordingly, the multi membrane structure 310 may cover the sound port 120 from the first side 101 of the multilayer component board 110. The multi membrane structure 310 may be arranged between the multilayer component board 110 and the MEMS sound transducer die 130. In this case, the multi membrane structure 310 may be in direct contact with the first side 101 of the multilayer component board 110 and in direct contact with the MEMS sound transducer die 130.

The (single or multi) mesh structure 150 may be located at the second side 102 of the multilayer component board 110. Accordingly, the multi-mesh structure 150 may cover the sound port 120 from the second side 102 of the multilayer component board 110.

Figure 1J:
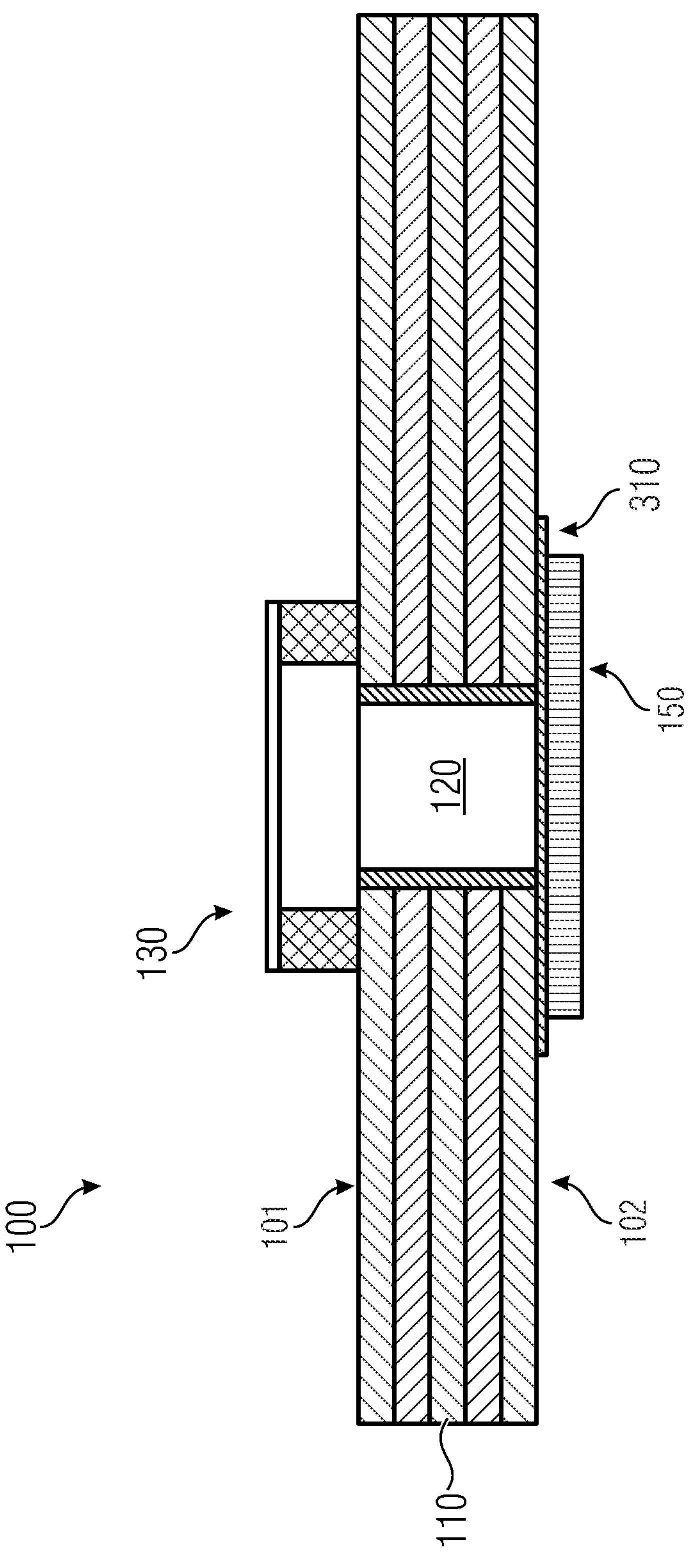
FIG. 1J shows a cross-sectional view of a sound transducer device according to a further embodiment.

FIG. 1J shows a further non-limiting example of a sound transducer device 100 according to the herein described innovative principle. Like elements with like functions will be referenced with like reference numerals. One major difference to the examples described so far is the location of the further (single or multi) membrane structure 310 in combination with the location of the (single or multi) mesh structure 150.

As can be seen in FIG. 1J, the (single or multi) membrane structure 310 may be located at the second side 102 of the multilayer component board 110. Accordingly, the (single or multi) membrane structure 310 may cover the sound port 120 from the second side 102 of the multilayer component board 110.

The (single or multi) mesh structure 150 may also be located at the second side 102 of the multilayer component board 110. The (single or multi) membrane structure 310 may be arranged between the multilayer component board 110 and the (single or multi) mesh structure 150. In this case, the (single or multi) membrane structure 310 may be in direct contact with the second side 102 of the multilayer component board 110 and in direct contact with the (single or multi) mesh structure 150.

However, it may also be possible that the (single or multi) mesh structure 150 may be positioned between the multilayer component board 110 and the (single or multi) membrane structure 310. In this case, the (single or multi) mesh structure 150 may be in direct contact with the second side 102 of the multilayer component board 110 and in direct contact with the (single or multi) membrane structure 310.

Figure 1K:
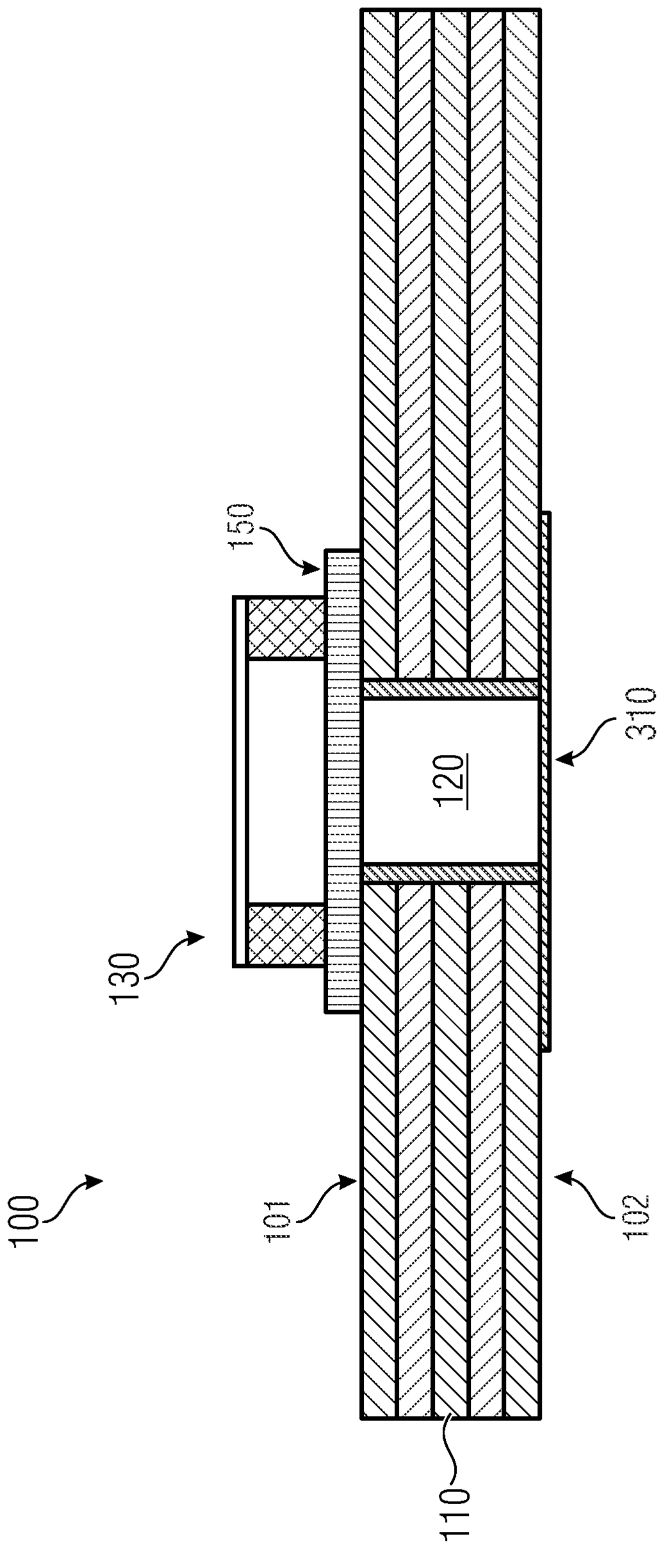
FIG. 1K shows a cross-sectional view of a sound transducer device according to a further embodiment.

FIG. 1K shows a further non-limiting example of a sound transducer device 100 according to the herein described innovative principle. Like elements with like functions will be referenced with like reference numerals. One major difference to the examples described so far is the location of the further (single or multi) membrane structure 310 in combination with the location of the (single or multi) mesh structure 150.

The (single or multi) membrane structure 310 may be located at the second side 102 of the multilayer component board 110. Accordingly, the (single or multi) membrane structure 310 may cover the sound port 120 from the second side 102 of the multilayer component board 110.

The (single or multi) mesh structure 150 may be located at the first side 101 of the multilayer component board 110. Accordingly, the (single or multi) mesh structure 150 may cover the sound port 120 from the first side 101 of the multilayer component board 110. The (single or multi) mesh structure 150 may be positioned between the multilayer component board 110 and the MEMS sound transducer die 130. In this case, the (single or multi) mesh structure 150 may be in direct contact with the first side 101 of the multilayer component board 110 and in direct contact with the MEMS sound transducer die 130.

Figure 1L:
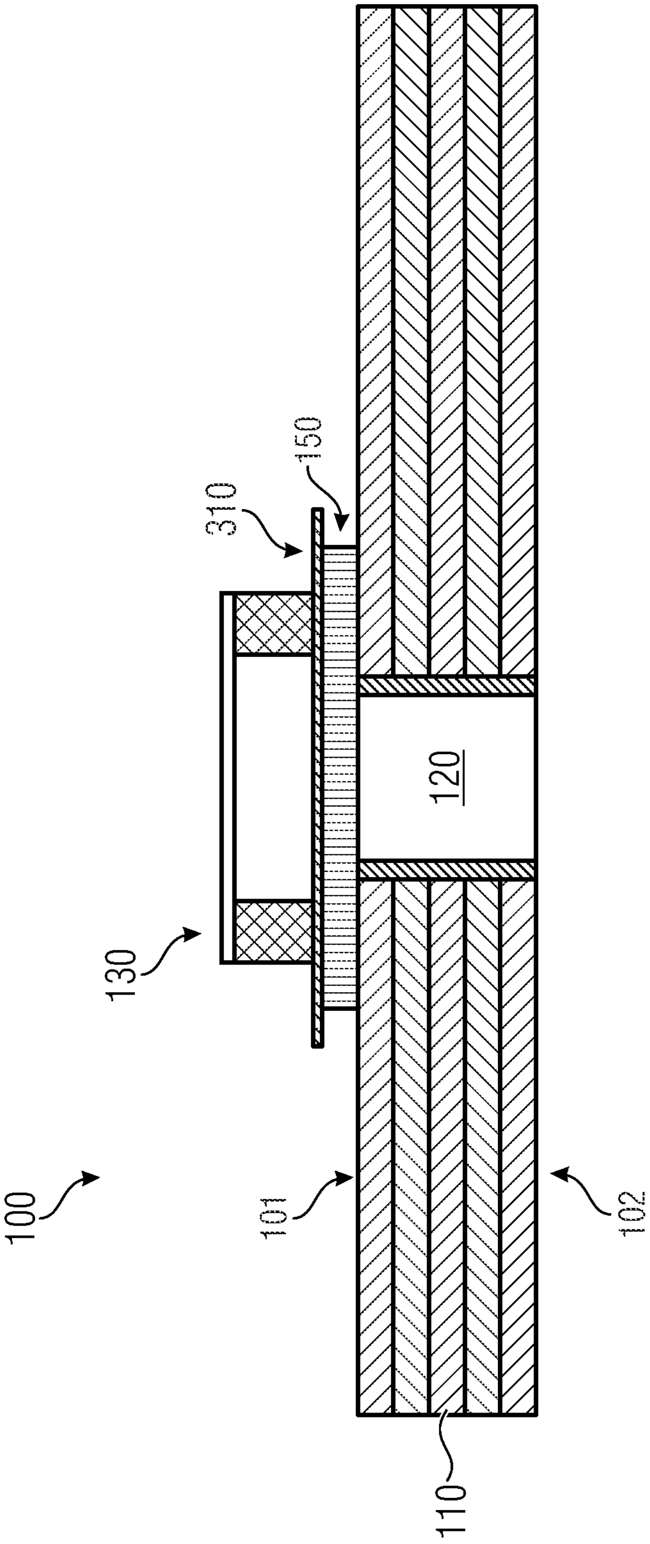
FIG. 1L shows a cross-sectional view of a sound transducer device according to a further embodiment.

FIG. 1L shows a further non-limiting example of a sound transducer device 100 according to the herein described innovative principle. Like elements with like functions will be referenced with like reference numerals. One major difference to the examples described so far is the location of the further (single or multi) membrane structure 310 in combination with the location of the (single or multi) mesh structure 150.

The (single or multi) mesh structure 150 may be located at the first side 101 of the multilayer component board 110. Accordingly, the (single or multi) mesh structure 150 may cover the sound port 120 from the first side 101 of the multilayer component board 110.

The (single or multi) membrane structure 310 may also be located at the first side 101 of the multilayer component board 110. Accordingly, the (single or multi) membrane structure 310 may also cover the sound port 120 from the first side 101 of the multilayer component board 110.

As exemplarily depicted in FIG. 1L, the (single or multi) membrane structure 310 may be arranged between the (single or multi) mesh structure 150 and the MEMS sound transducer die 130. In this case, the (single or multi) mesh structure 150 may be in direct contact with the first side 101 of the multilayer component board 110 and with the (single or multi) membrane structure 310. Furthermore, the (single or multi) membrane structure 310 may be in direct contact with the (single or multi) mesh structure 150 and with the MEMS sound transducer die 130.

Figure 1M:
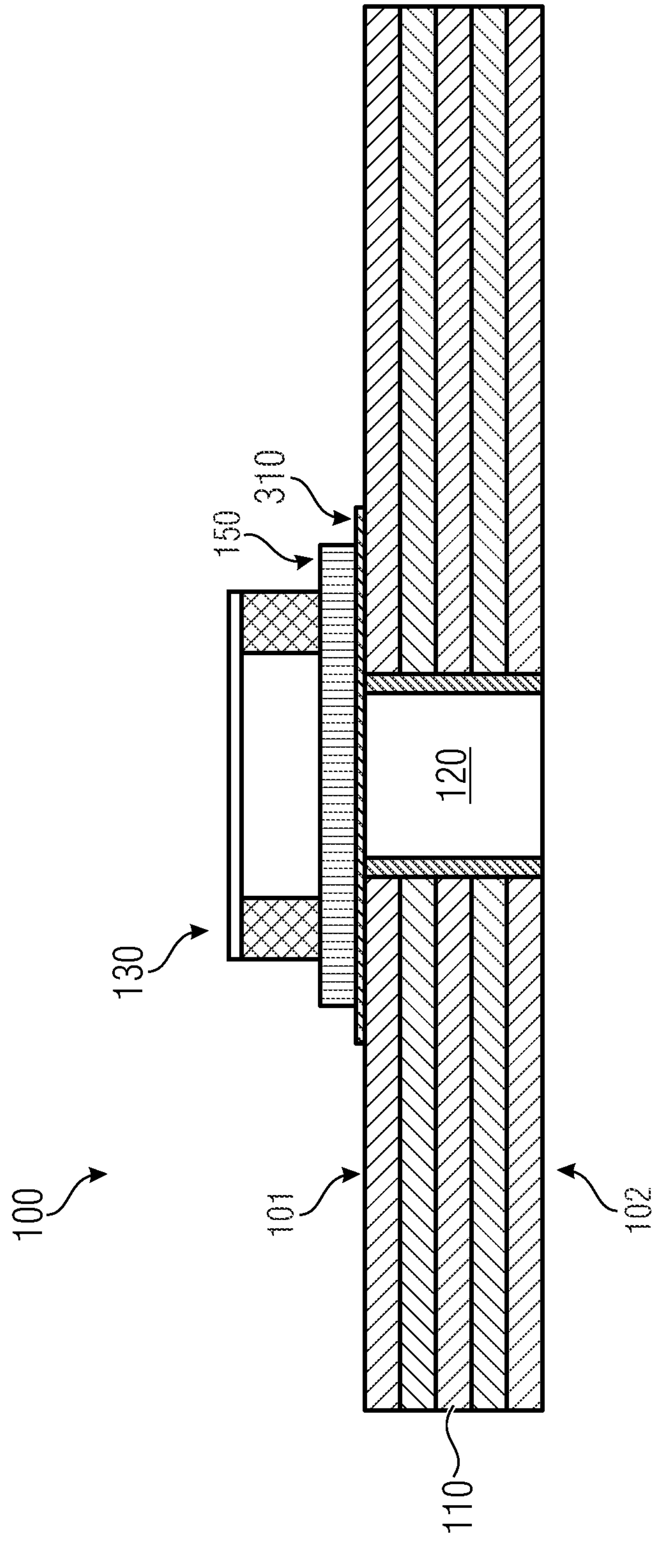
FIG. 1M shows a cross-sectional view of a sound transducer device according to a further embodiment.
Figure 1N:
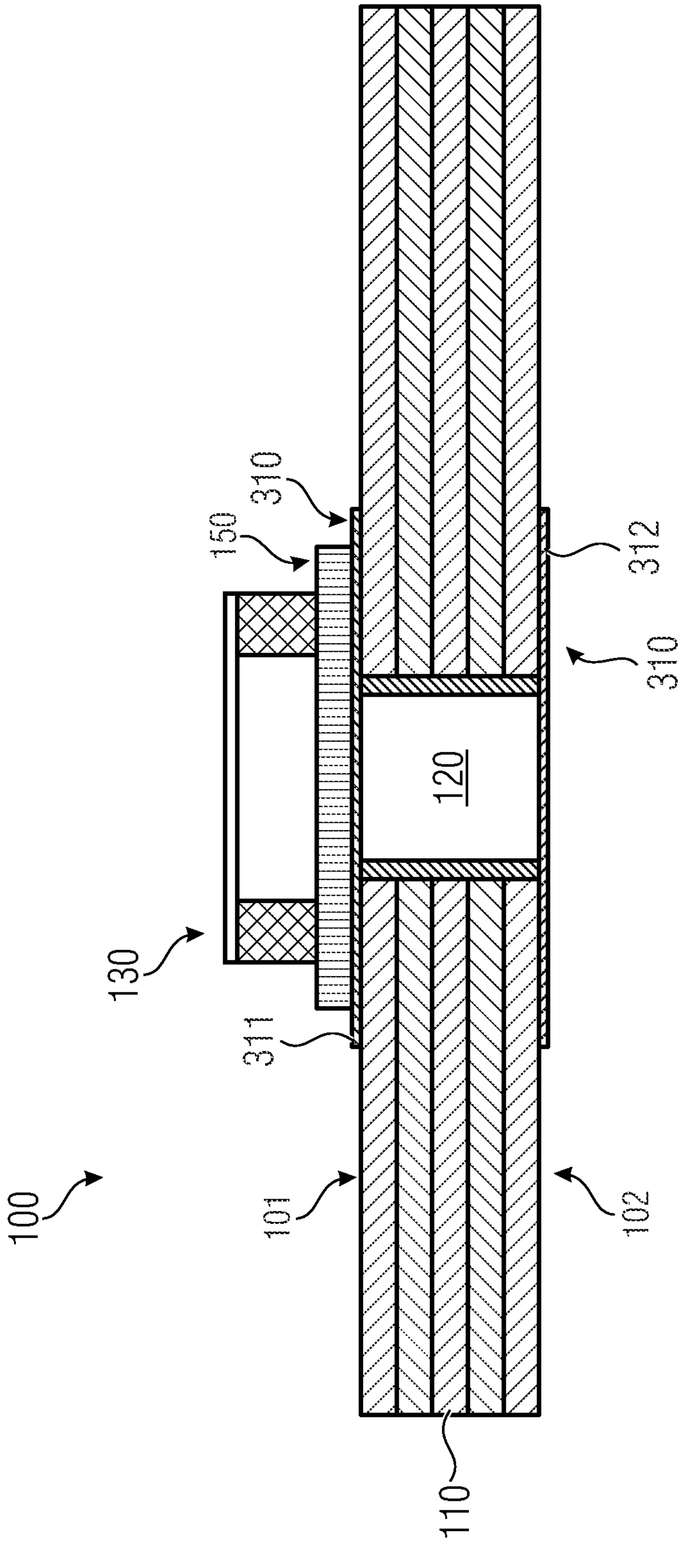
FIG. 1N shows a cross-sectional view of a sound transducer device according to a further embodiment.

FIG. 1M shows an alternative, wherein the (single or multi) mesh structure 150 may be arranged between the (single or multi) membrane structure 310 and the MEMS sound transducer die 130. In this case, the (single or multi) membrane structure 310 may be in direct contact with the first side of the multilayer component board 110 and with the (single or multi) mesh structure 150. Furthermore, the (single or multi) mesh structure 150 may be in direct contact with the (single or multi) membrane structure 310 and the MEMS sound transducer die 130.

FIG. 1N shows a further non-limiting example of a sound transducer device 100 according to the herein described innovative principle. Like elements with like functions will be referenced with like reference numerals. One major difference to the examples described so far is the location of the further (single or multi) membrane structure 310 in combination with the location of the (single or multi) mesh structure 150.

FIG. 1N shows an example in which the multi membrane structure 310 comprises at least two, and preferably exactly two, single membranes 311, 312. A first single membrane 311 may be located at the first side 101 of the multilayer component board 110. Accordingly, said first single membrane 311 covers the sound port 120 from the first side 101 of the multilayer component board 110.

A second single membrane 312 may be located at the second side 102 of the multilayer component board 110. Accordingly, said second single membrane 312 covers the sound port 120 from the second side 102 of the multilayer component board 110.

A (single or multi) mesh structure 150 may additionally be provided, wherein the location of the (single or multi) mesh structure 150 may be selected from one of the options as described herein. As exemplarily shown in FIG. 1N, the (single or multi) mesh structure 150 may be located at the first side 101 of the multilayer component board 110. The (single or multi) mesh structure 150 may be arranged between the first single membrane 311 and the MEMS sound transducer die 130, as exemplarily depicted in FIG. 1N. In this case, the (single or multi) mesh structure 150 may be in direct contact with the first single membrane 311 and in direct contact with the MEMS sound transducer die 130. Furthermore, the first single membrane 311 may be in direct contact with the (single or multi) mesh structure 150 and in direct contact with the first side 101 of the multilayer component board 110.

Alternatively, the first single membrane 311 may be arranged between the (single or multi) mesh structure 150 and the MEMS sound transducer die 130. In this case, the first single membrane 311 may be in direct contact with the (single or multi) mesh structure 150 and in direct contact with the MEMS sound transducer die 130. Furthermore, the (single or multi) mesh structure 150 may be in direct contact with the first single membrane 311 and in direct contact with the first side 101 of the multilayer component board 110.

Figure 1P:
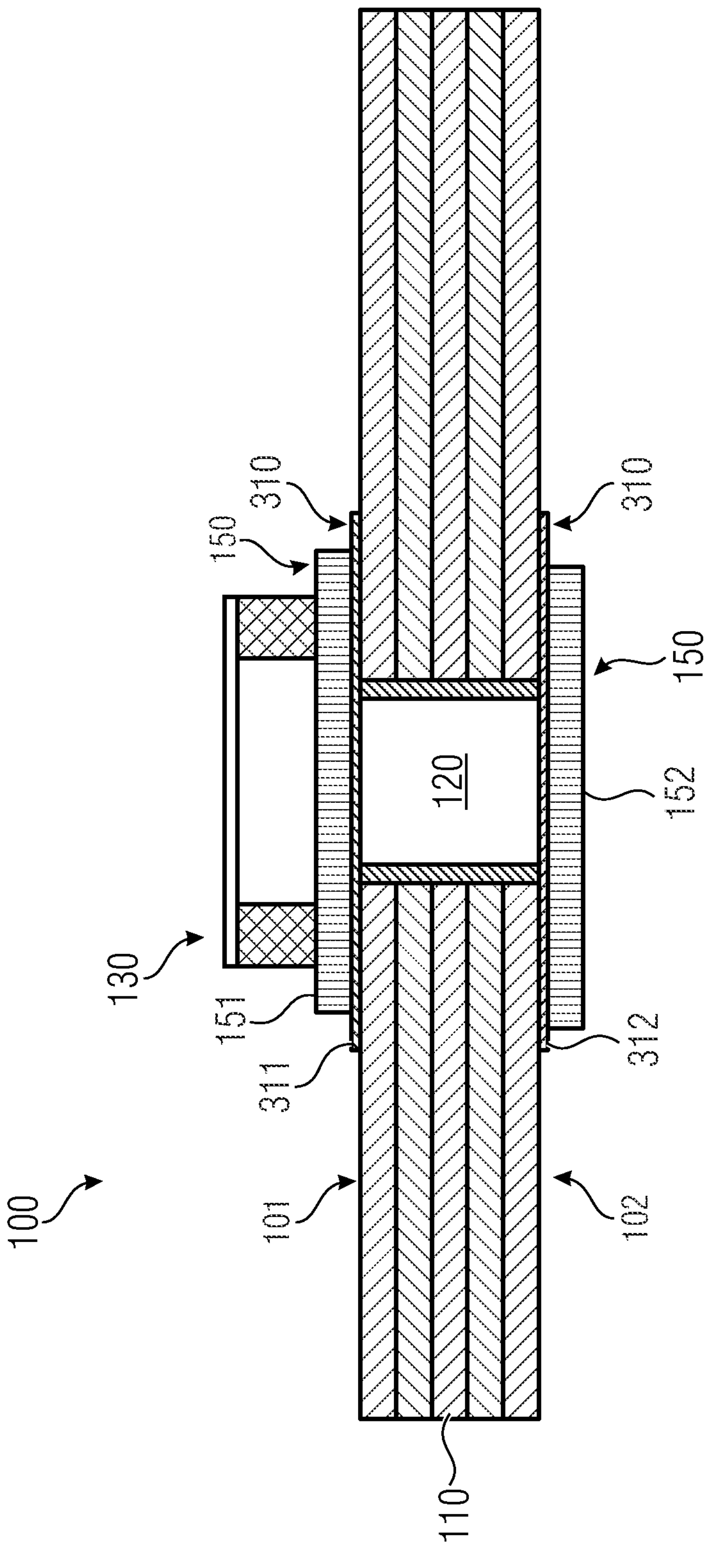
FIG. 1P shows a cross-sectional view of a sound transducer device according to a further embodiment.

FIG. 1P shows an example in which the multi membrane structure 310 comprises at least two, and preferably exactly two, single membranes 311, 312 and in addition a multi-mesh structure 150 comprising at least two, and preferably exactly two, single meshes 151, 152. A first single membrane 311 and a first single mesh 151 may be located at the first side 101 of the multilayer component board 110. Accordingly, said first single membrane 311 and said first single mesh 151 may cover the sound port 120 from the first side 101 of the multilayer component board 110. The first single mesh 151 may be arranged between the first single membrane 311 and the MEMS sound transducer die 130. In this case, the first single mesh 151 may be in direct contact with the first single membrane 311 and in direct contact with the MEMS sound transducer die 130. Furthermore, the first single membrane 311 may be in direct contact with the first single mesh 151 and in direct contact with the first side 101 of the multilayer component board 110.

Alternatively, the first single membrane 311 may be arranged between the first single mesh 151 and the MEMS sound transducer die 130. In this case, the first single membrane 311 may be in direct contact with the first single mesh 151 and in direct contact with the MEMS sound transducer die 130. Furthermore, the first single mesh 151 may be in direct contact with the first single membrane 311 and in direct contact with the first side 101 of the multilayer component board 110.

A second single membrane 312 and a second single mesh 152 may be located at the second side 102 of the multilayer component board 110. Accordingly, said second single membrane 312 and said second single mesh 152 may cover the sound port 120 from the second side 102 of the multilayer component board 110. The second single membrane 312 may be arranged between the multilayer component board 110 and the second single mesh 152. In this case, the second single membrane 312 may be in direct contact with the second single mesh 152 and in direct contact with the second side 102 of the multilayer component board 110.

Alternatively, the second single mesh 152 may be arranged between the multilayer component board 110 and the second single membrane 312. In this case, the second single mesh 152 may be in direct contact with the second single membrane 312 and in direct contact with the second side 102 of the multilayer component board 110.

Figure 1Q:
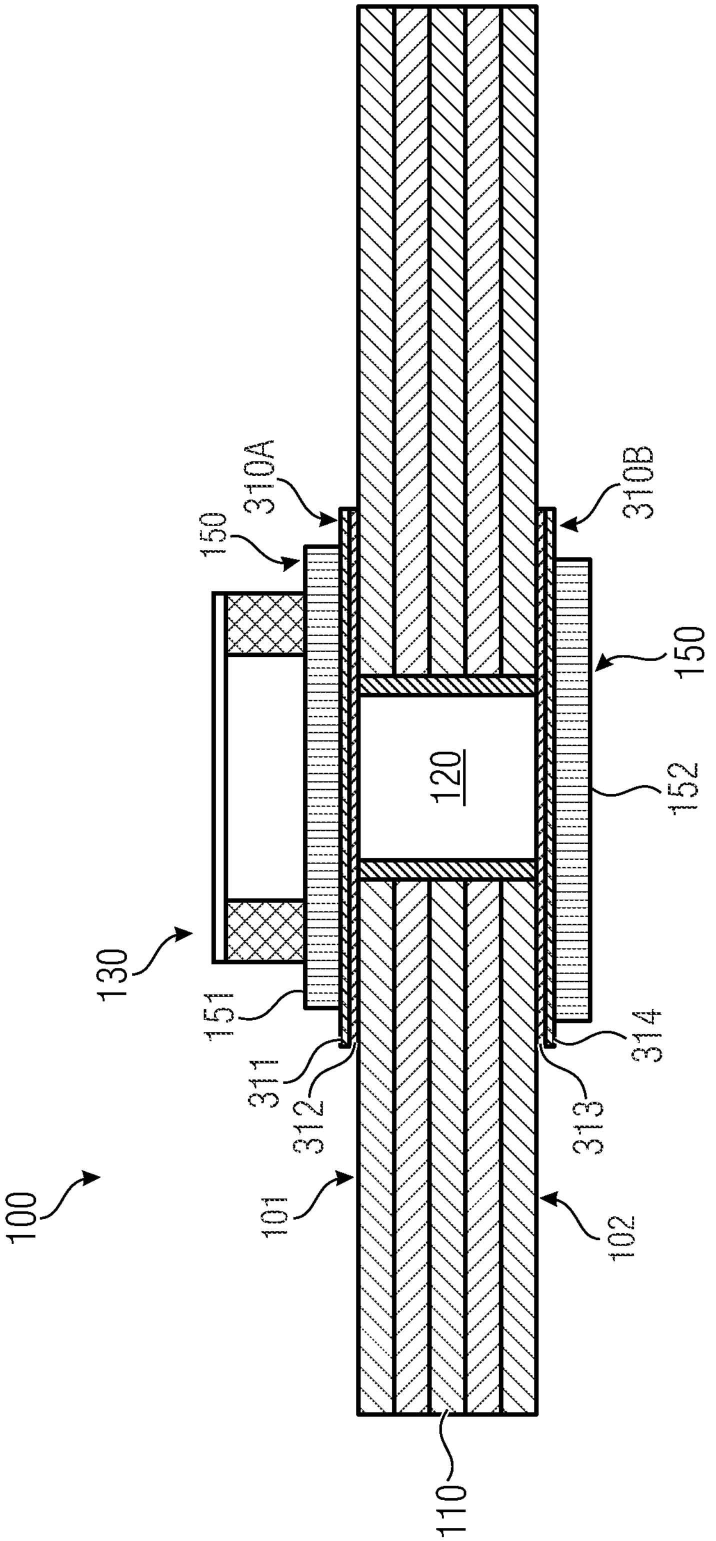
FIG. 1Q shows a cross-sectional view of a sound transducer device according to a further embodiment.

In the example shown in FIG. 1Q, the multi membrane structure 310 may comprise at least four, and preferably exactly four, single membranes 311, 312, 313, 314, wherein two of the at least four single membranes 311, 312, 313, 314 are in direct contact with each other.

A first multi membrane arrangement 310A of at least, and preferably exactly, two single membranes 311, 312 may be located at the first side 101 of the multilayer component board 110. In other words, said first multi membrane arrangement 310A of the multi membrane structure 310 may cover the sound port 120 from the first side 101 of the multilayer component board 110. The first multi membrane arrangement 310A of the multi membrane structure 310 may be arranged between the (single or multi) mesh structure 150 and the first side 101 of the multilayer component board 110. In this case, the first multi membrane arrangement 310A may be in direct contact with the (single or multi) mesh structure 150 and the first side 101 of the multilayer component board 110. Furthermore, the (single or multi-mesh) structure 150 may be in direct contact with the first multi membrane arrangement 310A and in direct contact with the MEMS sound transducer die 130.

Alternatively, the first multi membrane arrangement 310A of the multi membrane structure 310 may be arranged between the (single or multi) mesh structure 150 on the first side 101 of the multilayer component board 110 and the MEMS sound transducer die 130. In this case, the (single or multi) mesh structure 150 may be in direct contact with the first multi membrane arrangement 310A and in direct contact with the first side 101 of the multilayer component board 110. Furthermore, the first multi membrane arrangement 310A may be in direct contact with the (single or multi) mesh structure 150 and in direct contact with the MEMS sound transducer die 130.

A second multi membrane arrangement 310B of at least, and preferably exactly, two single membranes 313, 314 may be located at the second side 102 of the multilayer component board 110. In other words, said second multi membrane arrangement 310B of the multi membrane structure 310 may cover the sound port 120 from the second side 102 of the multilayer component board 110. The second multi membrane arrangement 310B of the multi membrane structure 310 may be arranged between the (single or multi) membrane structure 150 and the second side 102 of the multilayer component board 110. In this case, the second multi membrane arrangement 310B may be in direct contact with the (single or multi) membrane structure 150 and in direct contact with the second side 102 of the multilayer component board 110.

Alternatively, the (single or multi) mesh structure 150 may be arranged between the second side 102 of the multilayer component board 110 and the second multi membrane arrangement 310B of the multi membrane structure **31*o*. In this case, the (single or multi) mesh structure 150 may be in direct contact with the second multi membrane arrangement 310B and in direct contact with the second side 102 of the multilayer component board 110**.

Summarizing, the mesh structure 150 as described herein may comprise at least one, and preferably exactly one, single mesh 151. In this case, the mesh structure 150 may be referred to as a single mesh structure 150 (c.f. FIGS. 1A and 1B). Alternatively, the mesh structure 150 may comprise at least two, and preferably exactly two, single meshes 151, 152. In this case, the mesh structure 150 may be referred to as a multi-mesh structure 150. The single meshes 151, 152 of a multi-mesh structure 150 may be spatially separated from each other. In this case, a first one of the at least two single meshes 151, 152 may be located at the first side 101 of the multilayer component board 110, while a second one of the at least two single meshes 151, 152 may be located at the second side 102 of the multilayer component board 110 (c.f. FIG. 1C). Further alternatively, the single meshes 151, 152 may be in direct contact with each other and touching each other. In this case, the at least two single meshes 151, 152 may be stacked atop each other and may be arranged at either one of the first and second sides 101, 102 of the multilayer component board 110 (c.f. FIGS. 1D and 1E). Further alternatively, the multi-mesh structure 150 may comprise a first mesh arrangement 150A comprising at least two, and preferably exactly two, single meshes 151, 152. The multi-mesh structure 150 may further comprise a second mesh arrangement 150B comprising at least two, and preferably exactly two, single meshes 153, 154. The first mesh arrangement 150A may be located at the first side 101 of the multilayer component board 110, and the second mesh arrangement 150B may be located at the second side 102 of the multilayer component board 110 (c.f. FIG. 1F). The single meshes 151, 152, 153, 154 may each comprise the same or different dimensions. The single meshes 151, 152, 153, 154 may each comprise the same or different materials.

As far as the term mesh structure 150 is used herein, it covers both a single mesh structure and a multi-mesh structure.

The same holds for the herein described (single or multi) membrane structure 310. The membrane structure 310 as described herein may comprise at least one, and preferably exactly one, single membrane 311. In this case, the membrane structure 310 may be referred to as a single membrane structure 310 (c.f. FIG. 1G). Alternatively, the membrane structure 310 may comprise at least two, and preferably exactly two, single membranes 311, 312. In this case, the membrane structure 310 may be referred to as a multi membrane structure 310. The single membranes 311, 312 of a multi membrane structure 310 may be spatially separated from each other. In this case, a first one of the at least two single membranes 311, 312 may be located at the first side

101 of the multilayer component board 110, while a second one of the at least two single membranes 311, 312 may be located at the second side 102 of the multilayer component board 110 (c.f. FIG. 1N). Further alternatively, the single membranes 311, 312 may be in direct contact with each other and touching each other. In this case, the at least two single membranes 311, 312 may be stacked atop each other and may be arranged at either one of the first and second sides 101, 102 of the multilayer component board 110 (c.f. FIG. 1H). Further alternatively, the multi membrane structure 310 may comprise a first membrane arrangement 310A comprising at least two, and preferably exactly two, single membranes 311, 312. The multi membrane structure 310 may further comprise a second membrane arrangement 310B comprising at least two, and preferably exactly two, single membranes 313, 314. The first membrane arrangement 310A may be located at the first side 101 of the multilayer component board 110, and the second membrane arrangement 310B may be located at the second side 102 of the multilayer component board 110 (c.f. FIG. 1Q). The single membranes 311, 312, 313, 314 may each comprise the same or different dimensions. The single membranes 311, 312, 313, 314 may each comprise the same or different materials.

As far as the term membrane structure 310 is used herein, it covers both a single membrane structure and a multi membrane structure.

Figure 2:
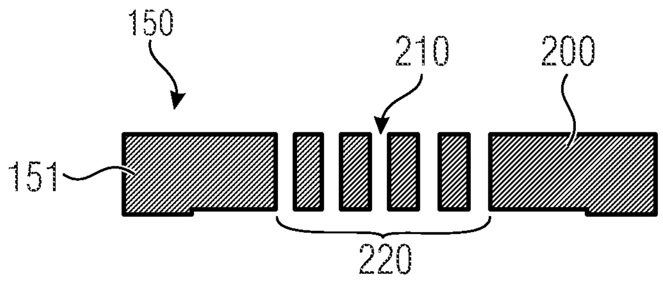
FIG. 2 shows a side view of a semiconductor mesh structure according to an embodiment.

FIG. 2 shows a non-limiting example of a mesh structure 150 comprising at least one single mesh 151 comprising or being made from an etched semiconductor platelet 200, i.e. a semiconductor mesh structure 150. According to this example, the semiconductor platelet 200 may comprise silicon. The platelet 200 comprises a plurality of vertically etched through holes 210. These through holes 210 may act as a strainer or a sieve. The through holes 210 may also be referred to as perforations. Accordingly, that portion of the mesh structure 150 comprising the through holes 210 (perforations) may also be referred to as a perforated portion 220. Furthermore, the terms perforations and through holes may be used synonymously herein.

Since the mesh structure 150 covers the sound port 120, the mesh structure 150 may be configured to prevent environmental elements like fluids, particulate matter or other objects from entering the sound transducer device 100 through the sound port 120. Therefore, the through holes 210 may comprise a diameter being smaller than the environmental objects or particles that shall be retained.

In some embodiments, the vertical through holes 210 may comprise a diameter configured to prevent water from passing through the mesh structure 150. This may be possible, for instance, if the through holes 210 are vertically etched by means of RIE or DRIE etching (RIE: Reactive Ion Etching—DRIE: Deep Reactive Ion Etching). Thus, the mesh structure 150 being made from etched semiconductor material may comprise water repellent properties. In some cases, the mesh structure 150 may be gas-permeable but liquid impermeable.

In other words, the mesh structure 150 provides an environmental barrier to protect the sound port 120 on sound transducer packages 100. The mesh structure 150 (environmental barrier) may be configured to repel moisture, dust and other physical objects, to ensure the continued operation of the MEMS sound transducer die 130 (e.g., silicon microphone) when no other external protection may be available. The following Figures show some embodiments for considering some potential forms of environmental barriers for a sound transducer device 100 to water, dust and intrusive physical damage. Some possible applications may comprise mobile handsets, where ingress protection (IP) requirements typically today are of ~IP68; dust-proof and waterproof to a specific underwater depth.

Alternatively, the mesh structure 150 may comprise at least one single mesh 151 comprising or being made from etched or laser cut (stainless) steel. Other materials that may be used for the at least one single mesh 151 of the mesh structure 150 may comprise at least one component of the group containing at least one of glass and glass-reinforced epoxy laminate material, in particular FR4 material. FR4 is a NEMA (National Electrical Manufacturers Association) grade designation for glass-reinforced epoxy laminate material. FR-4 is a composite material composed of woven fiberglass cloth with an epoxy resin binder that is flame resistant (self-extinguishing).

Figure 3:
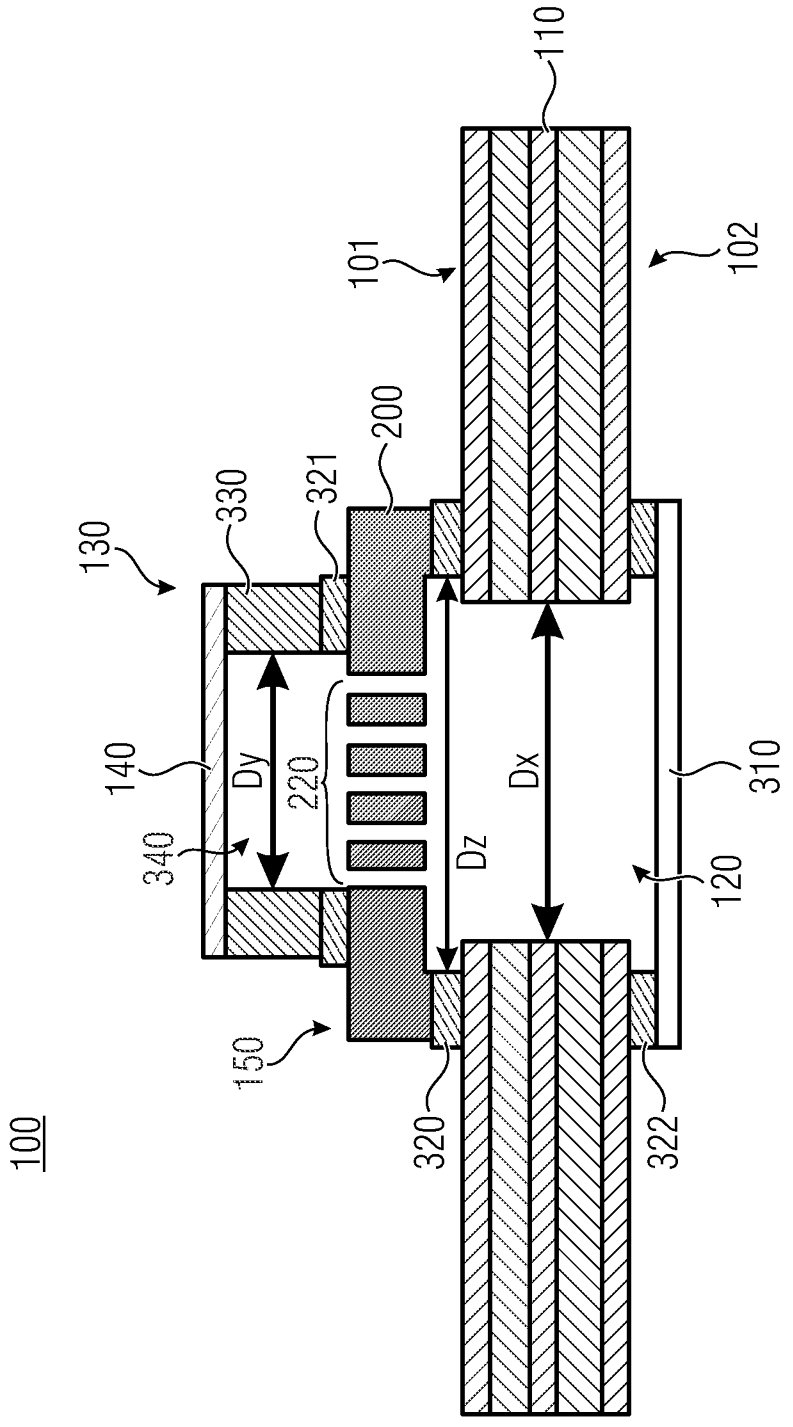
FIG. 3 shows a cross-sectional view of a sound transducer device according to a further embodiment.

FIG. 3 shows an example of a sound transducer device 100 according to the herein described innovative principle. In this embodiment, the mesh structure 150 may be positioned at the same side of the multilayer component board 110 as the MEMS sound transducer die 130. In this case, the mesh structure 150 and the MEMS sound transducer die 130 are arranged on the first side 101 of the multilayer component board 110. However, it may also be possible that both the mesh structure 150 and the MEMS sound transducer die 130 may be arranged on the second side 102 of the multilayer component board 110.

In particular, the mesh structure 150 may be arranged directly on (e.g., may be attached to) the first side 101 of the multilayer component board 110, for instance by means of solder, glue or any other kind of adhesive 320. The MEMS sound transducer die 130 may be arranged on top of the mesh structure 150, as exemplarily depicted in FIG. 3. The MEMS sound transducer die 130 may be arranged directly on (e.g., may be attached to) the mesh structure 150, for instance by means of solder, glue or any other kind of adhesive 321. As shown in FIG. 3, the MEMS sound transducer die 130 may be arranged on a surface of the mesh structure 150 being opposite the multilayer component board 110. Accordingly, the mesh structure 150 may be arranged between the MEMS sound transducer die 130 and the multilayer component board 110.

The MEMS sound transducer die 130 may comprise a bulk material 330 acting as a supporting structure for the membrane structure 140 such that the membrane structure 140 is suspended thereon. The MEMS sound transducer die 130, and in particular its bulk material 330 may comprise a cavity 340 having an inner diameter $D_Y$.

The sound port 120 that is provided in the multilayer component board 110 comprises a (mean) diameter $D_X$. The diameter $D_X$ of the sound port 120 may be larger than the inner diameter $D_Y$ of the MEMS sound transducer die 130. Thus, an enlarged sound port 120 may be provided which comprises a diameter $D_X$ being larger than the inner diameter $D_Y$ of the MEMS sound transducer die 130.

The enlarged diameter $D_X$ of the sound port 120 provides for an increased air flow through the sound port 120 towards the membrane structure 140 of the MEMS sound transducer die 130. This may be accomplished in that a diameter $D_Z$ of the mesh structure 150 may be larger than the diameter $D_X$ of the sound port 120. Accordingly, the mesh structure 150 may be arranged on the first side 101 of the multilayer component board 110 along a periphery of the sound port 120. In this way, the mesh structure 150 is securely attached to the multilayer component board 110 and efficiently covers the sound port 120. A 'periphery' of the sound port 120 means an outer circumferential portion extending around the circumference of the sound port opening 120 provided in the multilayer component board 110. Or in other words, the mesh structure 150 may be attached to the multilayer component board 110 in a vicinity of an outer circumference of the sound port 120 thereby covering the sound port 120 but leaving further lateral portions of the second side 102 of the multilayer component board 110 uncovered. Accordingly, the mesh structure 150 does not extend over the entire second side 102 (or first side 101, where applicable) of the multilayer component board 110 thereby saving mesh material and related costs.

In the example depicted in FIG. 3, the previously discussed vertical through holes 210 (FIG. 2) may be provided in the above described perforated portion 220 of the mesh structure 150. Said perforated portion 220 may have a diameter being equal to or slightly smaller than the inner diameter $D_Y$ of the MEMS sound transducer die 130. Furthermore, the vertical through holes 210 may be arranged opposite the membrane structure 140. Accordingly, air that flows through the (enlarged) sound port 120 passes through the vertical through holes 210 and into the cavity 340 of the MEMS sound transducer die 130 where it reaches the bottom side of the membrane structure 140. The mesh structure 150 acts as an environmental barrier which prevents any unwanted solid and/or liquid environmental particles from entering the cavity 340 of the MEMS sound transducer die 130 and from reaching the membrane structure 140.

In some alternative embodiments, the discussed mesh structure 150 comprising an etched semiconductor material 200 may be replaced by a metal mesh, as also described herein.

The sound transducer device 100 may optionally comprise a further membrane structure 310. Said further membrane structure 310 may comprise, or be made from, synthetic material, e.g. PTFE (Polytetrafluoroethylene). The further membrane structure 310 may comprise water repellent properties. For example, the further membrane structure 310 may comprise perforations having a diameter being small enough to prevent liquid or steam from passing through the perforations. Accordingly, the membrane 310 may prevent liquid or even steam from entering the MEMS sound transducer die 130 and from reaching the suspended membrane structure 140.

Additionally or alternatively, the mesh structure 150 may comprise perforations 210 having a diameter being small enough to prevent liquid or steam from passing through said perforations 210. This may be accomplished in particular with a semiconductor mesh structure 150.

In the non-limiting example depicted in FIG. 3, the further membrane structure 310 is arranged at the second side 102 of the multilayer component board 110, i.e. at the side opposite the MEMS sound transducer die 130 and, in this particular example, opposite the mesh structure 150. However, as will be described with reference to some different embodiments below, the further membrane structure 310 may be arranged at the first side 101 of the multilayer component board 110. In any case, the further membrane structure 310 may cover the sound port 120.

The further membrane structure 310 may be attached to the multilayer component board 110, for instance, by means of glue or any other kind of adhesive 322. The further membrane structure 310 may be arranged (at either the first or second side 101, 102 of the multilayer component board 110) along a periphery of the sound port 120 thereby covering the sound port 120 but leaving further lateral portions of the multilayer component board 110 uncovered. In this way, the further membrane structure 310 is securely attached to the multilayer component board 110 and efficiently covers the sound port 120.

Summarizing, FIG. 3 shows a mesh structure 150 comprising an etched semiconductor (e.g., silicon) 'mesh' die 200 attached over a wider diameter ($D_X > D_Y$) sound port 120. A water repellent further membrane structure 310 made from synthetic material (e.g., PTFE) may be attached to exterior of the multilayer component board 110. Alternatively, the semiconductor mesh die 200 could be substituted with a stainless steel mesh, for instance with a solid outer diameter onto which the MEMS sound transducer die 130 and the suspended membrane structure 140 could be attached.

Figure 4:
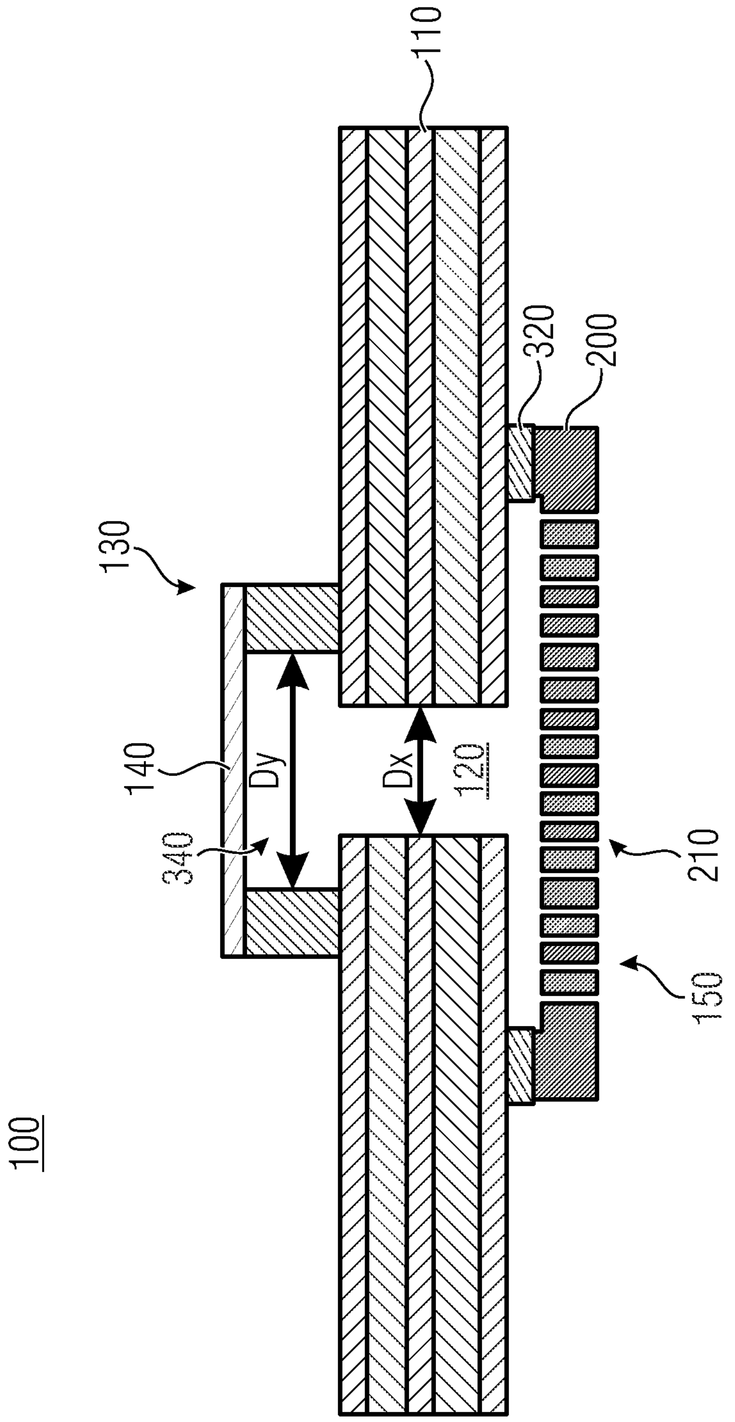
FIG. 4 shows a cross-sectional view of a sound transducer device according to a further embodiment.

FIG. 4 shows a further example of a sound transducer device 100 according to the herein described innovative principle. In this embodiment, the mesh structure 150 is arranged on a side of the multilayer component board 110 opposite the MEMS sound transducer die 130. In this particular but non-limiting example, the MEMS sound transducer die 130 may be arranged on the first side 101 of the multilayer component board 110 while the mesh structure 150 may be arranged on the opposite second side 102 of the multilayer component board 110.

The mesh structure 150 may be a semiconductor mesh die made from semiconductor material 200 (e.g., silicon), as described above. Alternatively, the mesh structure 150 may be a (stainless) steel mesh, for example an etched or laser cut steel mesh structure.

As can be seen, a further membrane structure 310 (FIG. 3) having water repellent properties may be omitted in this embodiment. Instead, the mesh structure 150 itself may comprise water repellent properties. To accomplish this, the mesh structure 150 may comprise vertically etched through holes 210 having dimensions being suitable for preventing water or steam to pass through said through holes 210. Said dimensions of said through holes 210 may be comparable to the above described perforations provided inside the further membrane structure 310 (FIG. 3).

The mesh structure 150 may be attached to the multilayer component board 110, for instance, by means of solder, glue or any other kind of adhesive 320. The mesh structure 150 may be arranged (at either the first or second side 101, 102 of the multilayer component board 110) along a periphery of the sound port 120. In this way, the mesh structure 150 is securely attached to the multilayer component board 110 and efficiently covers the sound port 120. Accordingly, the mesh structure 150 does not extend over the entire second side 102 (or first side 101) of the multilayer component board 110 thereby saving mesh material and related costs.

The sound port 120 provided in the multilayer component board 110 extends between the MEMS sound transducer die 130 and the mesh structure 150. The sound port 120 is in a functional relationship and in fluid connection with the MEMS sound transducer die 130 and the mesh structure 150, which means that air which flows from the environment through the mesh structure 150 flows through the sound port 120 into the cavity 340 of the MEMS sound transducer die 130 until reaching the suspended membrane structure 140.

In this particular example, the sound port 120 may comprise a diameter $D_X$ being smaller than the inner diameter $D_Y$ of the MEMS sound transducer die 130. As discussed above, the MEMS sound transducer die 130 may comprise a cavity 340, wherein the inner diameter $D_Y$ of the MEMS sound transducer die 130 may correspond to the inner diameter of the cavity 340.

Summarizing, FIG. 4 shows a non-limiting embodiment in which the mesh structure 150 may be a semiconductor mesh structure, e.g. an etched silicon mesh. The semiconductor material of the mesh structure 150 may be etched by means of RIE or DRIE etching. Vertical through holes 210 may be etched having dimensions comparable with pores or perforations that may be otherwise provided in the above discussed further membrane structure 310 (e.g., PTFE membrane). For example, the vertical through holes 210, i.e. the geometry of the vertical through holes 210, may be developed to the pore size of a PTFE tape. The semiconductor mesh structure 150 may be attached to the base, i.e. the second side 102, of the multilayer component board 110 of the sound transducer device 100. Water-resistance/repellent properties may be achieved by parylene coating the wafer before dicing.

Figure 5:
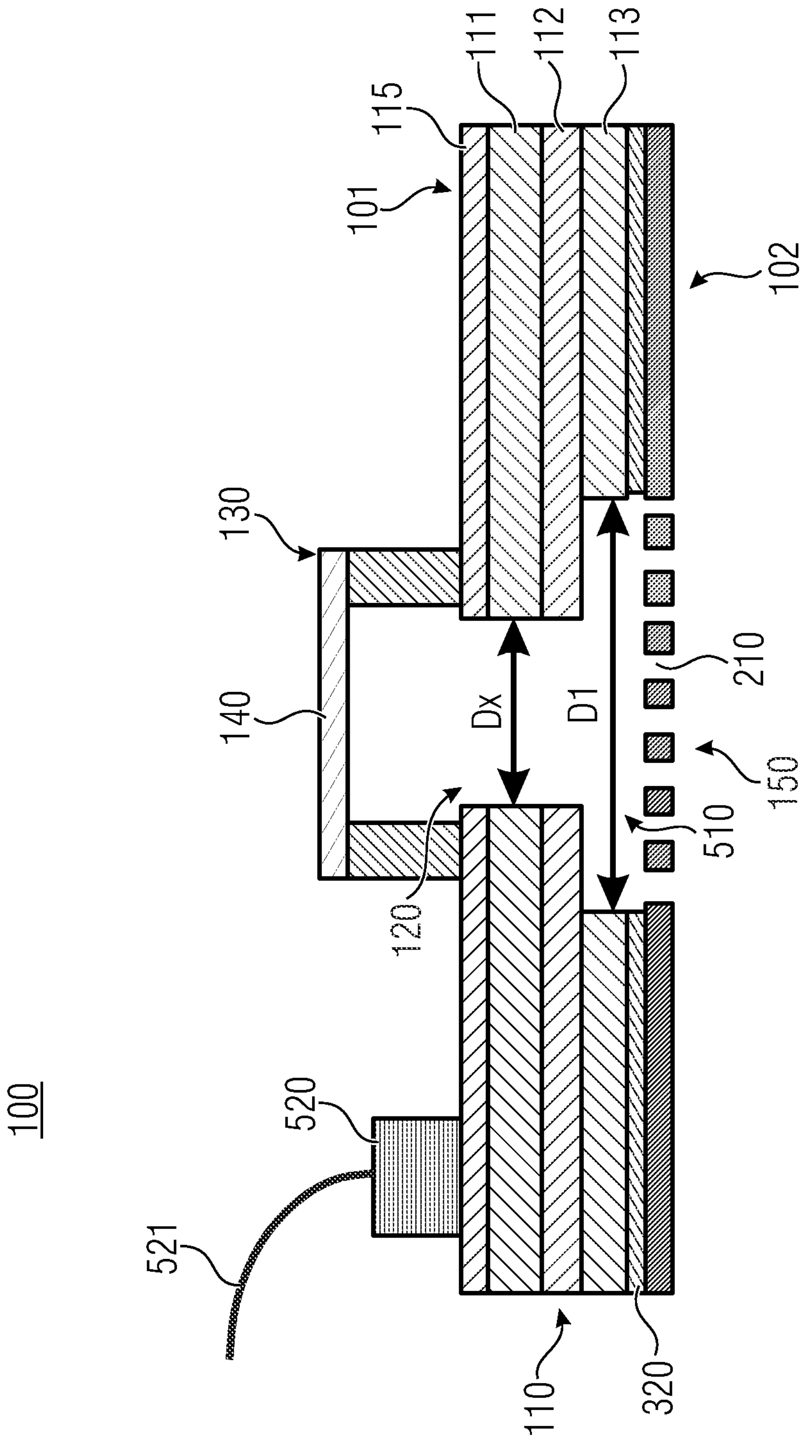
FIG. 5 shows a cross-sectional view of a sound transducer device according to a further embodiment.

FIG. 5 shows a further non-limiting exemplary embodiment of a sound transducer device 100 according to the herein described innovative principle. The MEMS sound transducer die 130 is arranged at the first side 101 of the multilayer component board 110. The multilayer component board 110 comprises a first recess 510 provided at the side 102 of the multilayer component board 110 opposite the MEMS sound transducer die 130.

In this particular example, the first recess 510 is provided in the second side 102 of the multilayer component board 110. In particular, the first recess 510 is provided in an area in which the sound port 120 is also provided, such that the sound port 120 is positioned between the first recess 510 and the MEMS sound transducer die 130. Accordingly, the first recess 510 and the sound port 120 are in a functional relationship and in fluid connection with each other thereby providing a continuous fluid passageway from the environment through the mesh structure 150 through the first recess 510 through the sound port 120 to the MEMS sound transducer die 130.

The first recess 510 may be provided in one or more layers 111, 112, 113, and 115 of the multilayer component board 110. The first recess 510 may comprise a first diameter $D_1$, the first diameter $D_1$ being larger than the diameter $D_X$ of the sound port 120. Accordingly, the first recess 510 may provide an enlarged entry opening of the sound port 120. Thus, a larger amount of air may enter the sound port 120 through the enlarged opening provided by said first recess 510.

A mesh structure 150 may be attached to the side 102 of the multilayer component board 110 on which the first recess 510 is provided. In this particular example, a mesh structure 150 may be provided at the second side 102 of the multilayer component board 110. The mesh structure 150 may be attached to the second side 102 of the multilayer component board by means of solder, glue or any other kind of adhesive 320.

The mesh structure 150 may be attached over the entire second side 102 of the multilayer component board 110. For example, the mesh structure 150 may be provided as a panel and the multilayer component board 110 may be provided as a panel onto which a plurality of sound transducer devices 100 may be mounted before getting singulated (e.g., diced). In this case, the panel format mesh structure 150 may be attached to the panel format multilayer component board 110 and the sound transducer devices 100 may be diced afterwards.

Alternatively, the mesh structure 150 may be attached to the respective side 101, 102 of the multilayer component board 110 along a periphery of the first recess 510 thereby covering the first recess 510 and leaving further lateral portions of the second side 102 of the multilayer component board 110 uncovered, as explained with reference to the previous Figures.

The mesh structure 150 may be attached to the multilayer component board 110 such that the perforations 210 of the mesh structure 150 cover the first recess 510. Thus, the mesh structure 150 provides for an environmental barrier.

The mesh structure 150 may be a (stainless) steel mesh structure or a semiconductor mesh structure, as discussed above. In case the mesh structure 150 is provided as a (stainless) steel mesh structure, then it could serve to provide a potential for grounding or ESD protection (ESD: Electro Static Discharge).

The sound transducer device 100 may further comprise an electrical connection portion 520 for electrically contacting the MEMS sound transducer die 130. For example, the sound transducer device 100 may comprise an Integrated Circuit (e.g., an Application Specific Integrated Circuit, ASIC) that may be connected with the electrical connection portion 520. In turn, the ASIC (not shown) may be electrically connected with the MEMS sound transducer die 130. As mentioned above, with reference to FIG. 1, the uppermost layer 115 of the multilayer component board 110 may comprise copper traces that may provide an electrical connection trace between the electrical connection portion 520, the integrated circuit (not shown) and the MEMS sound transducer die 130.

The electrical connection portion 520 may comprise an external electrical connection portion 521, for instance an isolated electrical wire, a flexi circuit or the like. Even though, the electrical connection portion 520 may have been exemplarily described with reference to FIG. 5, the feature of said electrical connection portion 520 may, of course, be applied to each and every embodiment as discussed herein.

Figure 6:
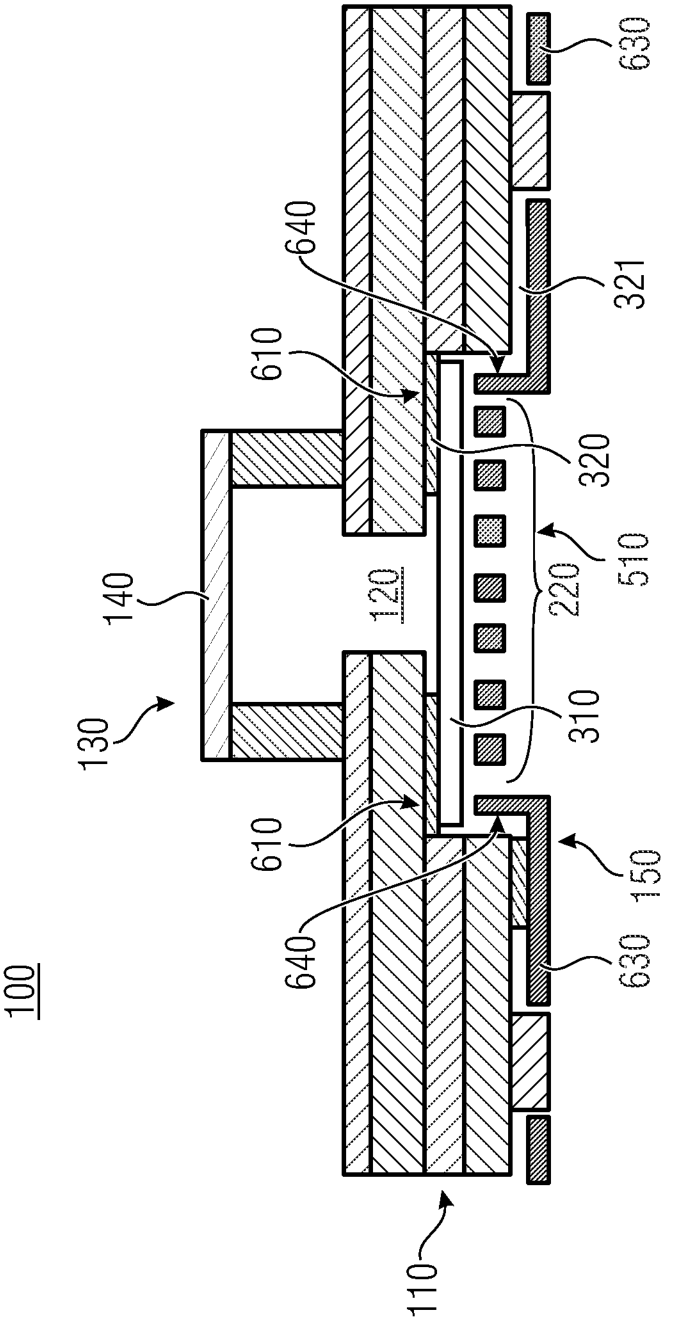
FIG. 6 shows a cross-sectional view of a sound transducer device according to a further embodiment.

FIG. 6 shows a further non-limiting exemplary embodiment of a sound transducer device 100 according to the herein described innovative principle. This embodiment is similar to the above described embodiment with reference to FIG. 5. Thus, the differences shall be discussed in the following.

For example, the embodiment as depicted in FIG. 6 additionally comprises a further membrane structure 310 (e.g., a PTFE membrane), as described above with reference to FIG. 3. Said further membrane structure 310 may comprise water repellent properties. The further membrane structure 310 may be provided inside the first recess 510 formed at the second side 102 of the multilayer component board 110. As described above, the first recess 510 may comprise a diameter $D_1$ (FIG. 5) that is larger than a diameter $D_X$ of the sound port 120. Accordingly, the first recess 510 may form a step or notch with respect the sound port 120, wherein said step forms a mounting portion 610 that circumferentially extends around the sound port 120. The further membrane structure 310 may be arranged at said mounting portion 610. The further membrane 310 may be attached to said mounting portion 610 by means of glue or any other kind of adhesive 320.

The sound transducer device 100 according to this embodiment may also comprise a mesh structure 150. In this particular example, the mesh structure 150 may comprise laterally extending flanges 630 acting as a support structure for supporting the perforated portion 220 of the mesh structure 150. In particular, said support structure 630 may comprise an indented portion 640 in which the perforated portion 220 of the mesh structure 150 is provided.

The indented portion 640 may extend into the first recess 510 such that the perforated portion 220 is arranged inside the first recess 510. The mesh structure 150 may be arranged on the multilayer component board 110 by attaching the laterally extending flanges 630 to the (first or second side 101, 102 of the) multilayer component board 110. The mesh structure 150, and in particular the laterally extending flanges 630, may be attached to the multilayer component board 110 by means of solder, glue or any other kind of adhesive 321. Said adhesive 321 may be adhered to the second side 102 of the multilayer component board 110 at a peripheral portion laterally surrounding the first recess 510, as exemplarily depicted in FIG. 5.

A plurality of mesh structures 150 comprising a support structure 630 having laterally extending flanges as well as an indented portion 640 formed therebetween may be provided in panel format. Said plurality of mesh structures 150 in panel format may be attached to a multilayer component board 110 also in panel format. After attaching the mesh panel with the board panel, the individual sound transducer devices 100 may be singulated.

The mesh structure 150 may be a (stainless) steel metal mesh structure or a semiconductor mesh structure. In this case, a metal mesh structure may be preferred since it may be easier to form the indented portion 640 inside a metal mesh structure than in a rigid semiconductor material. Furthermore, a metal mesh structure may provide a potential for grounding or ESD protection.

The mesh structure 150, and in particular the perforated portion 220 of the mesh structure 150, may be applied after the above described further membrane structure 310 was mounted at the mounting portion 610 inside the first recess 510. Accordingly, the further membrane structure 310 may be positioned between the mesh structure 150 and the MEMS sound transducer die 130.

The first recess 510 and the sound port 120 are in a functional relationship and in fluid connection with each other thereby providing a continuous fluid passageway from the environment through the mesh structure 150 arranged inside the first recess 510 through the further membrane structure 310 arranged inside the first recess 510 and through the sound port 120 to the MEMS sound transducer die 130.

In the embodiment shown in FIG. 6 the further membrane structure 310 may also be omitted. Furthermore, in the embodiment of FIG. 5, an additional further membrane structure 310 may be provided and positioned between the mesh structure 150 and the MEMS sound transducer die 130.

Figure 7:
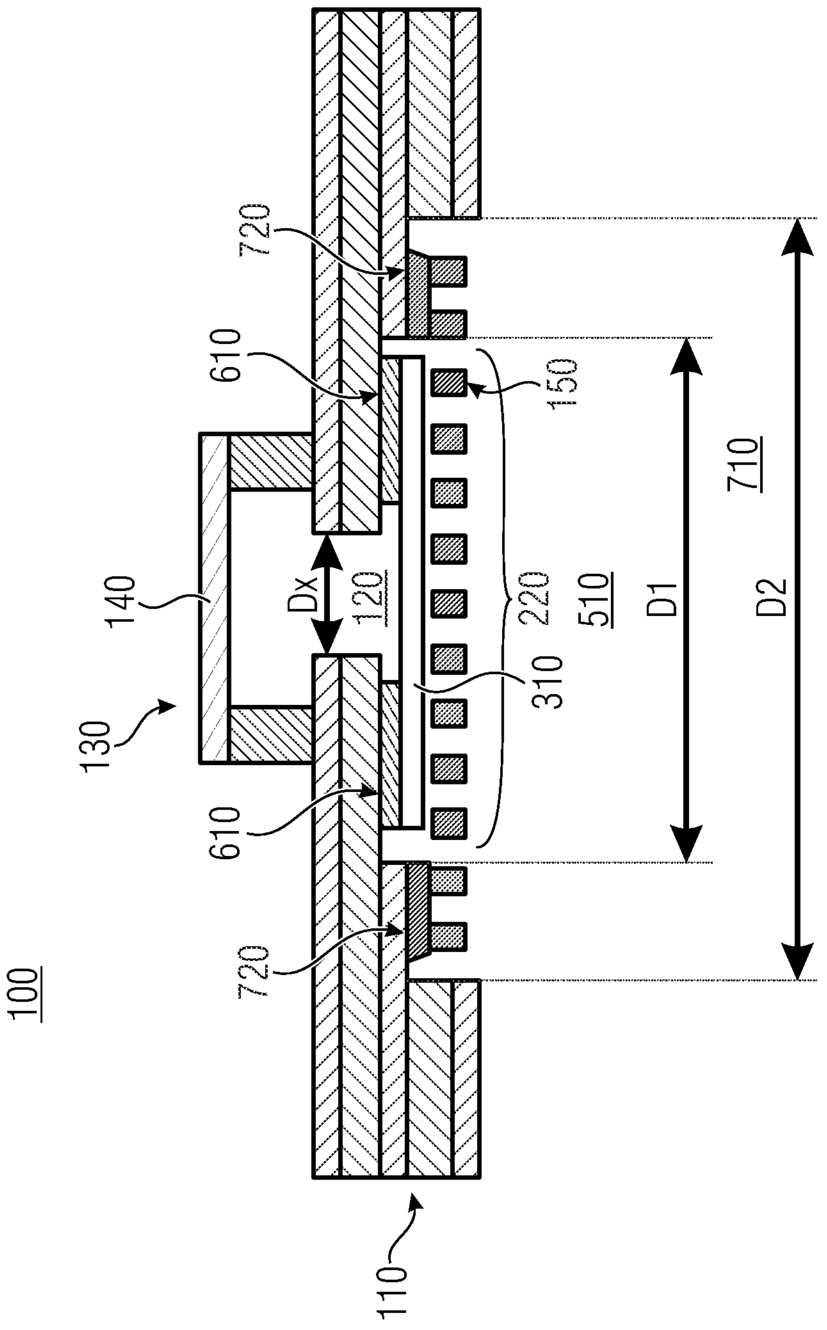
FIG. 7 shows a cross-sectional view of a sound transducer device according to a further embodiment.

FIG. 7 shows a further non-limiting exemplary embodiment of a sound transducer device 100 according to the herein described innovative principle. In addition to the previously described embodiments, the embodiment of FIG. 7 additionally comprises a second recess 710 provided at the second side 102 of the multilayer component board 110.

Said second recess 710 is provided in an area in which the sound port 120 and the first recess 510 are provided, such that the first recess 510 is positioned between the sound port 120 and the second recess 710. The sound port 120, the first recess 510 and the second recess 710 are in a functional relationship and in a fluid connection with each other thereby providing a continuous fluid passageway from the environment to the MEMS sound transducer die 130.

In particular, the sound transducer device 100 comprises a further membrane structure 310 (e.g., a PTFE membrane) which is arranged inside the first recess 510, as described above with reference to FIG. 6. That is, the further membrane structure 310 may be attached to a mounting portion 610 which derives from the fact that the diameter $D_1$ of the first recess 510 is larger than the inner diameter $D_X$ of the sound port 120 thereby creating a step or notch.

In a similar way the mesh structure 150 may be arranged inside the second recess 710. The second recess 710 has a diameter $D_2$ larger than the diameter $D_1$ of the first recess 510 thereby creating a step or notch. Said step or notch may form a mounting portion 720 for mounting the mesh structure 150. For example, the mesh structure 150 may be attached to said mounting portion 720 by means of solder, glue or any other kind of adhesive.

The mesh structure 150 may be arranged entirely inside the second recess 710 which means that the mesh structure 150 does not protrude over the second side 102 of the multilayer component board 110.

Additionally or alternatively, the further membrane structure 310 may be arranged entirely inside the first recess 510 which means that the further membrane structure 310 does not protrude over the mounting portion 720 of the second recess 710.

In some embodiments, such as shown in FIG. 7, the further membrane structure 310 may slightly protrude over the mounting portion 720 of the second recess 710 as long as it does not collide with the adjacent perforated portion 220 of the mesh structure 150.

The mesh structure 150 may be a (stainless) steel metal mesh structure or a semiconductor mesh structure. In this particular embodiment, the mesh structure 150 may provide a mechanical environmental protection for the further membrane structure 310 since the mesh structure 150 covers said further membrane structure 310.

The first recess 510, the second recess 710 and the sound port 120 are in a functional relationship and in fluid connection with each other thereby providing a continuous fluid passageway from the environment through the mesh structure 150 arranged inside the second recess 710 through the further membrane structure 310 arranged inside the first recess 510 and through the sound port 120 to the MEMS sound transducer die 130.

Figure 8:
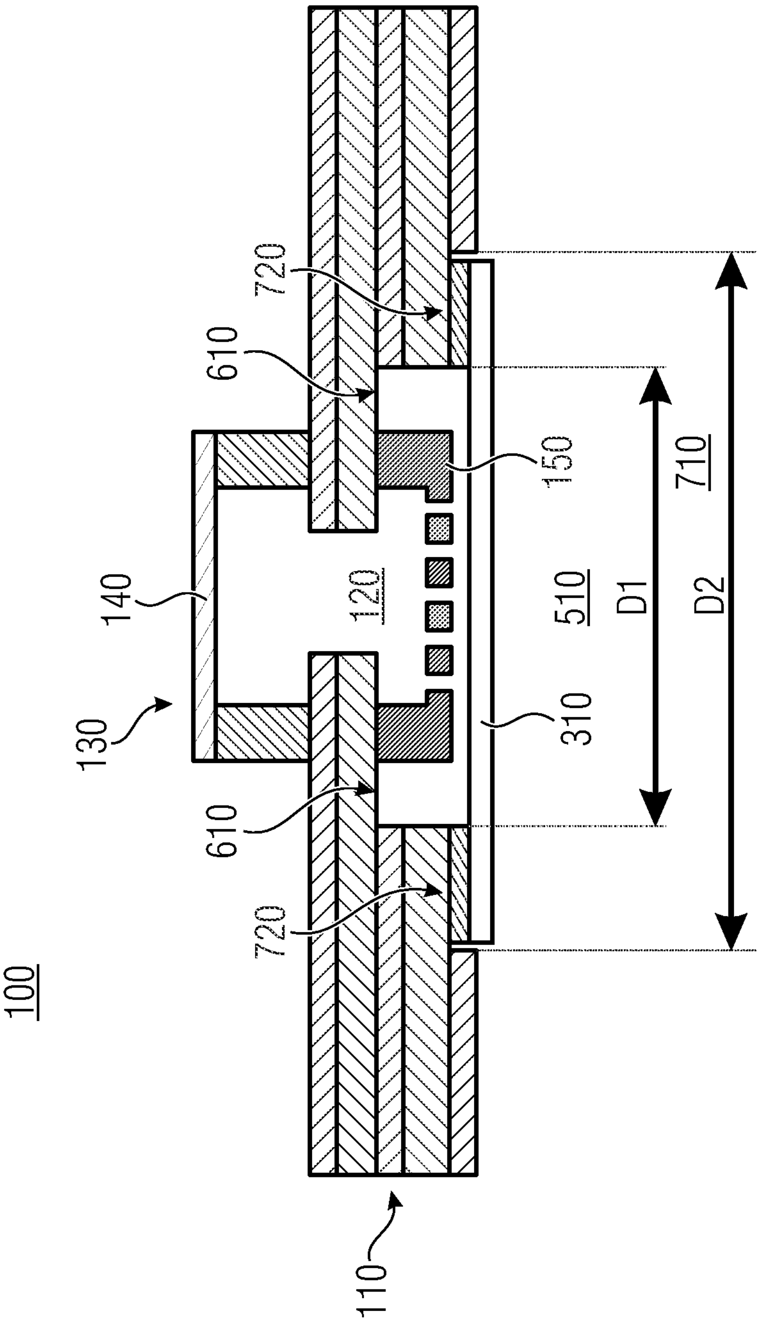
FIG. 8 shows a cross-sectional view of a sound transducer device according to a further embodiment.

FIG. 8 shows a further non-limiting exemplary embodiment of a sound transducer device 100 according to the herein described innovative principle. This embodiment is similar to the embodiment described above with reference to FIG. 7. However, the positions of the mesh structure 150 and the further membrane structure 310 are switched.

That is, the mesh structure 150 may be arranged inside the first recess 510, while the further membrane structure 310 may be arranged inside the second recess 710. The mesh structure 150 may be attached to a mounting portion 610 created by the formation of a notch or step due to the above described different diameters $D_1$ of the first recess 510 and $D_X$ of the sound port 120. The further membrane structure 310 may be attached to a mounting portion 720 created by the formation of a notch or step due to the above described different diameters $D_1$ of the first recess 510 and $D_2$ of the second recess 710.

The mesh structure 150 may be a (stainless) steel metal mesh structure or a semiconductor mesh structure. In this particular embodiment, the further membrane structure 310 may provide a mechanical environmental protection for the mesh structure 150 since the further membrane structure 310 covers said mesh structure 150.

Summarizing, the herein described innovative concept concerns sound transducer devices 100 and methods of environmental protection for silicon MEMs structures in cavity packages.

The herein described innovative principle provides a barrier over a silicon MEMS that allows the transmission of sound, but prevents the physical entry of water, dust or other small objects. Accordingly, it is one of the objects of the herein described innovative principle to prevent ingress of water and foreign objects into the delicate area of the silicon MEMs sound sensing die. A further object of the herein described innovative principle is to prevent damage to the silicon MEMs membrane 140 sited at the top of the sound port 120, inside the sound transducer die (e.g., SiMic) package.

Embodiments may comprise mesh structures 150 being sited at the top or the bottom of the sound port 120. All embodiments described herein are scalable to volume manufacture, either by integration/conversion of materials prior to delivery to the assembly line, or combining materials. Mature assembly processes can then be easily used.

The sound transducer device 100 according to the herein described innovative principle comprises at least the following advantages:

- transmits sound with minimum acoustic attenuation
- no acoustic distortion to the signal
- rugged enough to become the primary barrier on a mobile device exterior
- prevents water and dust ingress
- prevents pointed items being inserted into the microphone port and membrane, damaging the microphone or disabling the water/dust protection
- does not fall out, or delaminate from the substrate over the life of the mobile device
- withstands cleaning by vacuum or (slightly) higher than ambient air pressure
- provides resistance to solvents or cleaning fluids, coke type fizzy drinks
- survives temperature cycles, humidity, shock and drop events.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

What is claimed is:

1. A sound transducer device comprising:

a multilayer component board having a first side and a second side opposite the first side;

a sound port extending between the first side and the second side of the multilayer component board;

a MEMS (Micro Electro Mechanical System) sound transducer die comprising a suspended membrane structure, wherein the MEMS sound transducer die is arranged at the first side of the multilayer component board with its suspended membrane structure being in fluid communication with the sound port;

a mesh structure for providing an environmental barrier, the mesh structure covering the sound port from either one of the first side or the second side of the multilayer component board;

a first recess provided at the second side of the multilayer component board in an area in which the sound port is provided, such that the sound port is positioned between the first recess and the MEMS sound transducer die, wherein the first recess comprises a first diameter, the first diameter being larger than a diameter of the sound port; and a second recess provided at the second side of the multilayer component board in an area in which the sound port and the first recess are provided, such that the first recess is positioned between the sound port and the second recess, wherein the second recess has a second diameter larger than the first diameter.

2. The sound transducer device according to claim 1, wherein the mesh structure is a multi-mesh structure comprising at least two single meshes, wherein a first single mesh and a second single mesh comprise or are made from the same material, or wherein the first single mesh and the second single mesh comprise or are made from different materials.

3. The sound transducer device according to claim 1, wherein the mesh structure comprises at least one single mesh being made of a chemically etched or laser cut metal.

4. The sound transducer device according to claim 1, wherein the mesh structure comprises at least one single mesh comprising at least one component of a group of glass, glass-reinforced epoxy laminate material and FR4.

5. The sound transducer device according to claim 1, wherein the mesh structure comprises at least one single mesh comprising or being made of a silicon platelet comprising a plurality of vertically etched through holes acting as the environmental barrier.

6. The sound transducer device according to claim 5, wherein the through holes are RIE-etched (RIE: Reactive Ion Etching) through holes having a diameter configured to prevent water from passing through the silicon platelet.

7. The sound transducer device according to claim 1, wherein the mesh structure is positioned at the same side of the multilayer component board as the MEMS sound transducer die, and wherein the mesh structure is arranged between the multilayer component board and the MEMS sound transducer die.

8. The sound transducer device according to claim 1, wherein the MEMS sound transducer die comprises a cavity having an inner diameter, and wherein the sound port comprises a diameter which is larger than the inner diameter of the MEMS sound transducer die.

9. The sound transducer device according to claim 1, wherein the mesh structure is positioned at a side of the multilayer component board opposite the MEMS sound transducer die with the sound port extending between the MEMS sound transducer die and the mesh structure.

10. The sound transducer device according to claim 1, wherein the mesh structure is attached to the second side of the multilayer component board along a periphery of the sound port thereby covering the sound port and leaving further lateral portions of the second side of the multilayer component board uncovered.

11. The sound transducer device according to claim 1, comprising a further membrane structure having a water repellant characteristic, the further membrane structure being arranged at either one of the first side or the second side of the multilayer component board and covering the sound port.

12. The sound transducer device according to claim 1, wherein the mesh structure comprises a support structure, the support structure having an indented portion in which a perforated portion of the mesh structure is provided, wherein the indented portion extends into the first recess such that the perforated portion of the mesh structure is arranged inside the first recess.

13. The sound transducer device according to claim 1, comprising a further membrane structure having a water repellant characteristic, wherein said further membrane structure is arranged inside the first recess and positioned between the mesh structure and the MEMS sound transducer die.

14. The sound transducer device according to claim 1, comprising a further membrane structure having a water repellant characteristic, wherein said further membrane structure is mounted in the first recess and the mesh structure is mounted in the second recess.

15. The sound transducer device according to claim 1, comprising a further membrane structure having a water repellant characteristic, wherein the mesh structure is mounted in the first recess and the further membrane structure is mounted in the second recess.

16. The sound transducer device according to claim 11, wherein the further membrane structure is a multi-membrane structure comprising at least two single membranes, wherein a first single membrane and a second single membrane comprise or are made from the same material, or wherein the first single membrane and the second single membrane comprise or are made from different materials.

17. The sound transducer device according to claim 11, wherein the further membrane structure comprises at least one single membrane comprising or being made of at least one component of a group comprising Polytetrafluoroethylene (PTFE), organic material, polysilicon and polyamide.

18. A sound transducer comprising:

a multilayer component board having a first side and a second side opposite the first side;

a sound port extending between the first side and the second side of the multilayer component board;

a micro electro mechanical system (MEMS) die comprising a suspended membrane structure, wherein the MEMS die is arranged at the first side of the multilayer component board, the suspended membrane structure being in fluid communication with the sound port;

a mesh structure providing an environmental barrier and covering the sound port;

a first recess provided at the second side of the multilayer component board at the sound port, the sound port being positioned between the first recess and the MEMS die, wherein the first recess comprises a first diameter being larger than the sound port; and a second recess at the second side of the multilayer component board at the sound port, the first recess located between the sound port and the second recess, wherein the second recess has a second diameter larger than the first diameter.

19. A method of forming a sound transducer device, the method comprising:

providing a multilayer component board having a first side and a second side opposite the first side;

providing a sound port extending between the first side and the second side of the multilayer component board;

providing a micro electro mechanical system (MEMS) die comprising a suspended membrane structure, wherein the MEMS die is arranged at the first side of the multilayer component board, the suspended membrane structure being in fluid communication with the sound port;

providing a mesh structure providing an environmental barrier and covering the sound port;

providing a first recess provided at the second side of the multilayer component board at the sound port, the sound port being positioned between the first recess and the MEMS die, wherein the first recess comprises a first diameter being larger than the sound port; and providing a second recess at the second side of the multilayer component board at the sound port, the first recess located between the sound port and the second recess, wherein the second recess has a second diameter larger than the first diameter.

* * * * *